(12) United States Patent
Vella et al.

(10) Patent No.: US 8,023,563 B2
(45) Date of Patent: Sep. 20, 2011

(54) METHOD AND SYSTEM FOR PROCESSING SIGNALS VIA PERCEPTIVE VECTORIAL QUANTIZATION, COMPUTER PROGRAM PRODUCT THEREFOR

(75) Inventors: Filippo Vella, Casa Santa Erice (IT); Arcangelo Ranieri Bruna, San Cataldo (IT); Antonio Vincenzo Buemi, Catania (IT); Andrea Lorenzo Vitali, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1792 days.

(21) Appl. No.: 10/911,205

(22) Filed: Aug. 3, 2004

(65) Prior Publication Data
US 2005/0063472 A1     Mar. 24, 2005

Related U.S. Application Data

(63) Continuation-in-part of application No. 10/674,903, filed on Sep. 30, 2003, now Pat. No. 7,742,521.

(30) Foreign Application Priority Data
Oct. 4, 2002  (EP) ..................... 02425601

(51) Int. Cl.
    H04N 7/12      (2006.01)
(52) U.S. Cl. ................................. 375/240.22
(58) Field of Classification Search ............. 375/240.22
    See application file for complete search history.

(56) References Cited

U.S. PATENT DOCUMENTS

| | | | |
|---|---|---|---|
| 5,054,025 A * | 10/1991 | Galand et al. ................. | 714/800 |
| 5,193,003 A * | 3/1993 | Kondo ..................... | 375/240.12 |
| 5,214,507 A | 5/1993 | Aravind et al. | |
| 5,341,441 A * | 8/1994 | Maeda et al. ................. | 382/253 |
| 5,731,836 A * | 3/1998 | Lee ........................... | 375/240.16 |
| 5,764,803 A | 6/1998 | Jacquin et al. ................ | 382/236 |
| 5,835,144 A | 11/1998 | Matsumura et al. | |
| 6,363,113 B1 | 3/2002 | Faryar et al. | |

(Continued)

OTHER PUBLICATIONS

Chun, K. et al., "An Adaptive Perceptual Quantization Algorithm for Video Coding," *IEEE Transactions on Consumer Electronics* 39(3):555-558, Jun. 1993.

(Continued)

*Primary Examiner* — Jay Patel
*Assistant Examiner* — Richard Torrente
(74) *Attorney, Agent, or Firm* — Lisa K. Jorgenson; Timothy L. Boller; Seed IP Law Group PLLC

(57) ABSTRACT

The system carries out conversion of digital video signals organized in blocks of pixels from a first format to a second format. The second format is a format compressed via vector quantization. The vector quantization is performed by means of repeated application of a scalar quantizer to the pixels of said blocks with a quantization step (Q) determined in an adaptive way according to the characteristics of sharpness and/or brightness of the pixels and representing said vector quantization in a n-dimensional space indicative of the characteristics on n of said pixels in the block partitioned into cells of size proportional to said quantization step, each cell being assigned to an appropriate binary code, wherein said process further includes identifying at least one symmetry element in said n-dimensional space suitable for separating at least two symmetrical set of cells, and selecting one of said at least two symmetrical set of cells for the assignment of said binary codes. A symmetrical permutation on the n pixels of the block is performed according the selection and a part of said binary code indicating the status of said symmetrical permutation is conveniently set.

81 Claims, 12 Drawing Sheets

U.S. PATENT DOCUMENTS

| | | | |
|---|---|---|---|
| 6,385,245 | B1 | 5/2002 | De Haan et al. |
| 6,438,268 | B1 * | 8/2002 | Cockshott et al. ............ 382/253 |
| 6,463,100 | B1 | 10/2002 | Cho et al. |
| 6,625,219 | B1 | 9/2003 | Stopler |

OTHER PUBLICATIONS

Höntsch, I. et al., "Locally Adaptive Perceptual Image Coding," *IEEE Transactions on Image Processing* 9(9):1472-1483, Sep. 2000.

Jayant, N. et al., "Signal Compression Based on Models of Human Perception," in *Proceedings of the IEEE*, New York, Oct. 1, 1993, vol. 81, No. 10, pp. 1385-1421.

Balasubramanian, Raja et al., "Sequential Scalar Quantization of Vectors: An Analysis," IEEE Transactions on Image Processing, vol. 4, No. 9, Sep. 1995, 14 pages.

Pennebaker, William B. et al., *JEPG Still Image Data Compression Standard*, Chapman & Hall, New York, 1992.

Taubman, David S. et al., *JPEG2000 Image compression, Fundamentals, Standards and Practice*, The Kluwer Int. Series in Eng. and Computer Science, Vol. 642, Nov. 2001.

Gonzales, Rafael, C. et al., *Digital Image Processing*, Addison-Wesley, 1993.

Rec. ITU-R BT.601-5, "Studio Encoding Parameters of Digital Television for Standard 4:3 and Wide-Screen 16:9 Aspect Ratios", 1995, 15 pages.

* cited by examiner

| G | R | G | R | G |
|---|---|---|---|---|
| B | G | B | G | B |
| G | R | G | R | G |
| B | G | B | G | B |
| G | R | G | R | G |

FIG. 3

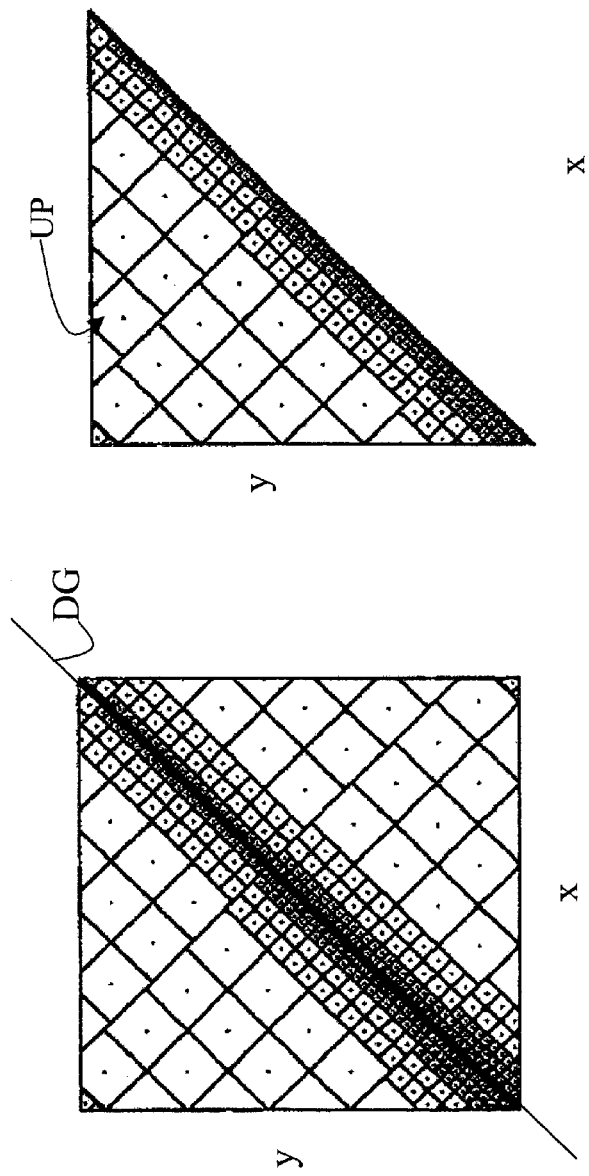
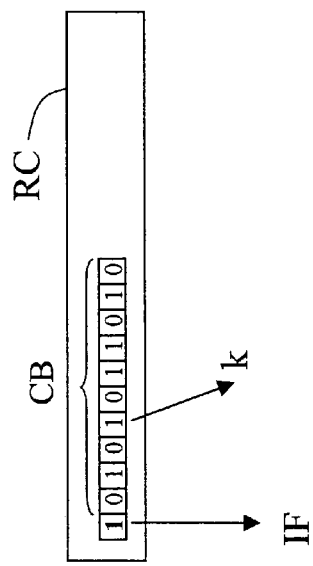
Fig. 12a
Fig. 12b
Fig. 13

METHOD AND SYSTEM FOR PROCESSING SIGNALS VIA PERCEPTIVE VECTORIAL QUANTIZATION, COMPUTER PROGRAM PRODUCT THEREFOR

CROSS-REFERENCE TO RELATED APPLICATION

The present application is a continuation-in-part of U.S. patent application Ser. No. 10/674,903, entitled "METHOD AND SYSTEM FOR PROCESSING SIGNALS VIA PERCEPTIVE VECTORIAL QUANTIZATION, COMPUTER PROGRAM PRODUCT THEREFORE," filed Sep. 20, 2003, assigned to the same assignee as the present application, and incorporated herein by reference in its entirety.

BACKGROUND OF THE INVENTION

1. Field of the Invention

The present disclosure relates generally to techniques for signal processing and has been developed with particular but not exclusive attention paid to possible applications in the framework of systems which envisage reduction in the quantity of data required for representing, in a digital format, an image (still picture) or a sequence of images (video sequence).

2. Description of the Related Art

Known to the art are various solutions for efficient compression of digital images. These solutions are usually characterized by a high computational complexity and are not easily integratable in the solutions commonly referred to as System on a Chip (SoC).

The techniques of compression of digital images can be classified in two fundamental groups.

A first group comprises the so-called lossless compression techniques i.e., techniques without loss of quality, which can be used also for processing other types of digital data. The purpose of this type of compression is to remove the statistical redundancy of the data.

To each digital datum there is assigned a variable number of bits, which depends upon the statistical frequency of the particular datum in question.

With reference, by way of example, to the so-called Huffmann compression, to each digital datum there is assigned a variable integer number of bits according to the following rule: short binary codes are assigned to the more frequent data, whereas long binary codes are assigned to less frequent data.

Also known are techniques of arithmetic compression, in which to each digital datum there is assigned a variable and fractional number of bits. The criterion of assignment of the bits is similar to the one used for the Huffmann compression.

Other compression methods are based upon the use of dictionaries. The sequences of the digital data to be compressed are reduced to words of variable length of a dictionary. Corresponding to each word is an appropriate binary code of a fixed or variable length. Belonging in this context is the algorithm for identification of the optimal dictionary due to Lempel and Ziv.

A second group of known compression techniques comprises the lossy compression techniques i.e., techniques with loss of quality.

The purpose of this type of compression is to remove the perceptive redundancy in the data. The image is modified by eliminating what cannot be perceived, or is perceived less, by the human visual system (HVS). The characteristic that is most widely exploited by the visual system amounts to the fact that the sensitivity to low frequencies is higher than the sensitivity to high frequencies. In addition, the perception of the spatial resolution of brightness information is more marked than the perception of chromaticity information.

The representation of the chromaticity information may therefore be less precise, in the sense that the spatial resolution may be lower. The chrominance is, therefore, under-sampled as compared with the brightness. The loss of quality which derives therefrom is practically not perceived by the human eye.

By way of example, for the ITU-R BT.601 standard, the under-sampling ratio between the luminance signal (Y) and the two color differences (CbCr or UV or IQ or DbDr) is 4:2:2. For the well-known MPEG standard the ratio is 4:2:0, where 0 indicates that under-sampling is both vertical and horizontal.

Likewise, the representation of the other sequences may be less precise, in the sense of a coarser quantization, with consequent saving in bits. The loss of perceived quality that derives therefrom is, however, low on account of the lower sensitivity of the visual system to these frequencies.

The splitting into high and low frequencies can be done only after having passed from the spatial domain to the frequency domain by means of the transformation operation. The most widely used transformations are, by way of example, the discrete cosine transform (DCT) and the discrete wavelet transform (DWT).

BRIEF SUMMARY OF THE INVENTION

One embodiment of the present invention provides a solution that is improved as compared to the ones provided by the known art from various standpoints and, in particular, as regards the needs to keep computational complexity (i.e., the number of processing operations and the number of storage units) low with a view to integration of the function of image compression or decompression in a more complex system, without penalizing markedly compression efficiency and, therefore, enabling a reduction in the area occupied on the silicon by the corresponding circuits, with the consequent reduction in production costs, at the same time achieving a reduced dissipation (this latter factor being particularly important for low-power devices).

Another embodiment of the invention also regards the corresponding system, as well as the corresponding computer product, which is directly loadable into the internal memory of a digital processor and contains portions of software code that are able to implement the process when said computer product is run on a numeric processor.

The solution according to an embodiment of the invention can be integrated, for example, both in a digital unit for image acquisition (CCD/CMOS sensors) and in an image-display unit (LCD display). In particular, in the case of digital cameras and similar or related devices, the data are acquired by the sensor according to a spatial pattern known as Bayer color-filter array (CFA), which enables association of just one of the three color components to each pixel. The corresponding RGB image is then reconstructed by means of an image-processing sequence (Image Generation Pipeline, IGP), among which there is always present a block dedicated to compression.

The fact of adding a further compression, placing it immediately after the acquisition of the data from the sensor, enables a reduction of the band necessary for transmission of the image from the processing unit or storage unit to the display. This solution is useful above all in the case of applications in which the acquired data are to be transmitted for remote processing thereof.

Basically, the solution according to an embodiment of the invention is based upon the construction of a vector or multi-dimensional quantizer with non-uniform quantization cells for digital-data arrays containing (linear or non-linear) chromatic components.

The vector quantizer is built so as to enable the simultaneous reduction of the statistical and perceptive redundancy of the data contained in the array and to minimize the complexity of the encoding (which corresponds to compression) and the decoding (which corresponds to decompression).

BRIEF DESCRIPTION OF THE DRAWINGS

Embodiments of the invention will now be described, purely by way of non-limiting examples, with reference to the annexed drawings, in which:

FIG. 3 illustrates the scanning diagram of one of the chromatic components (in particular, the green component) of a so-called Bayer pattern, in the context of a system operating according to an embodiment of the invention.

FIGS. 12 to 15 represent examples of application of the solution according a further simplified embodiment of the invention.

DETAILED DESCRIPTION

Embodiments for processing signals via perceptive vectorial quantization are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
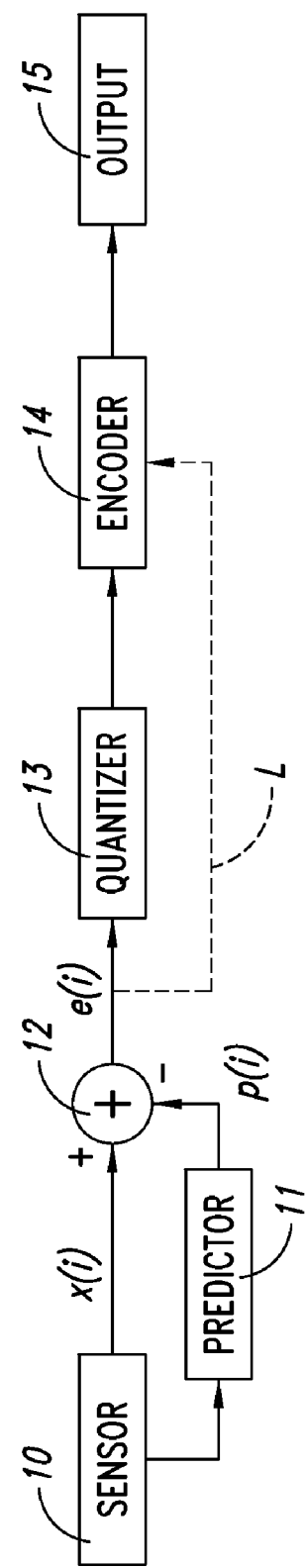
FIG. 1 illustrates, in the form of a block diagram, the scheme of an encoding circuit operating according to an embodiment of the invention.

With initial reference to the diagram of FIG. 1, the block designated by 10 represents, as a whole, a sensor (in what follows, the sensor in question will be assumed to be an image sensor of the type commonly referred to as Bayer sensor), which is able to generate at output a signal $x(i)$ representing an image in a digital format.

Sensors of the above type are widely known to the art; therefore, the corresponding operating characteristics, also as regards the characteristics of the signals generated, do not call for a detailed description herein.

The reference number 11 designates, in FIG. 1, a predictor block, which can generate, from the input image generated by the block 10, a corresponding prediction signal $p(i)$. In the example illustrated herein, the prediction signal is generated, for each signal $x(i)$, as a function of the previous value $x(i-1)$.

Consequently, the signal $p(i)$ can be expressed as:

$$p(i)=\text{predictor}(x(i))=x(i-1).$$

The signals $x(i)$ and $p(i)$ are then added (with opposite signs) in a summation node 12, which generates, at its output, a prediction-error signal $e(i)$ that can be expressed in general as:

$$e(i)=x(i)-p(i)$$

with $e(1)=x(1)$.

The reference 13 designates a block in which the prediction-error signal $e(i)$ undergoes quantization and is then subjected, in a block designated by 14, to a symbol-encoding function which lies at the basis of the output image, designated, as a whole, by 15.

The encoding diagram represented, merely by way of example and hence without any intention of limiting the scope of the invention, in FIG. 1 is, therefore, basically of the type commonly referred to as differential PCM (DPCM). The lossy aspect of the encoding is clearly linked to the quantization function implemented in block 13.

The dashed line designated by L indicates that, in the case of a lossless encoding, the prediction errors are not quantized before the encoding carried out in block 14.

Figure 2:
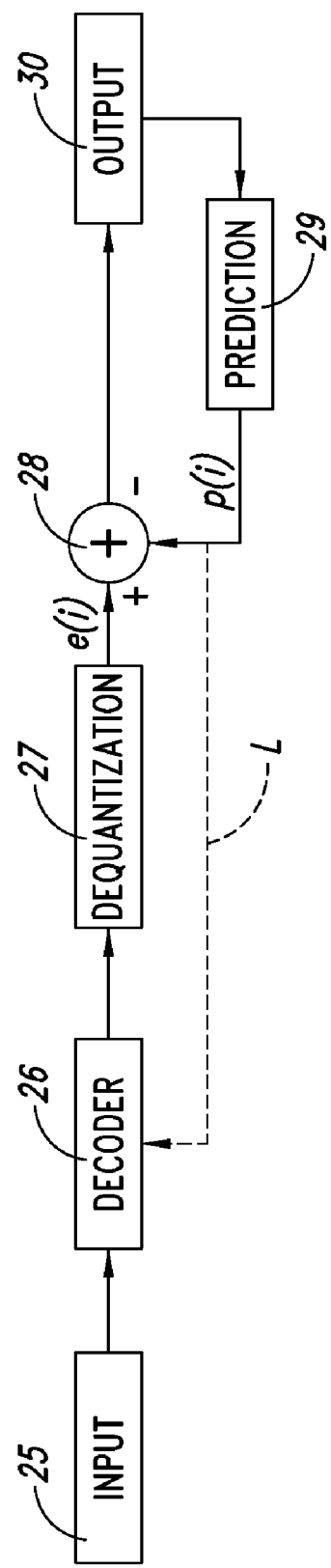
FIG. 2 illustrates, once again in the form of a block diagram, the structure of an embodiment of a decoding circuit which can be used in the context of the invention.

The block diagram of FIG. 2 illustrates the complementary decoding function. Here, the input image 25 (comprising a compressed image which can be virtually identified with the image 15 deriving from the encoding action) is supplied to a symbol-(de)coding block 26 and then passes to a (de)quantization block 27 where the prediction-error signal $e(i)$ is reconstructed and is then added with sign, in a node designated by 28, to a prediction signal $p(i)$ generated by a prediction block 29. The above is done in order to generate a signal corresponding to the reconstructed output image represented by block 30.

It will be appreciated that, also in the case of the DPCM decoder of FIG. 2, the prediction block 29 operates according to the value of the reconstructed signal for the preceding instant in time.

In other words, the decoding function represented in the diagram of FIG. 2 corresponds to the implementation of the relation:

$$x(i)=e(i)+p(i)$$

with $x(1)=e(1)$.

Also in the diagram of the decoder illustrated in FIG. 2, the dashed line designated by L shows the possible recourse to lossless decoding techniques, in which the signal at output from the block 26 is sent immediately downstream, by-passing the dequantization block 27.

The diagrams represented in FIGS. 1 and 2 have an altogether general and generic nature and apply to digital image signals of any kind.

The quantization operation represented by block 13 (of course, the same considerations apply, in a complementary way, to the dequantization block 27) envisages that the array of data representing the input signal in the specific case, the prediction error $e(i)$ will be split into blocks of pixels. When the block of pixels contains just one pixel, the quantization technique deriving therefrom is referred to as scalar quantization; otherwise, it is referred to as vector or multi-dimensional quantization.

In order to obtain minimum computational complexity, two pixels per block are preferably chosen. In this case, the quantizer is two-dimensional, i.e., the vector to be quantized has a dimension of 2.

When the number of pixels so enables, the block is preferably square, the aim being not to favor vertical orientation over horizontal orientation, in order to increase compression isotropy.

In the case of image sequences, the three-dimensional block is preferably cubic, for the reasons already illustrated.

The intensity of the pixels contained in the block constitutes an n-tuple of co-ordinates in an n-dimensional space. The n-dimensional space is partitioned into cells, each cell containing a reconstruction point. To each reconstruction point there is assigned an appropriate binary code.

The vector or multi-dimensional quantization operation, which can be implemented in block 13, comprises passing from the binary representation of the intensity of the pixels contained in the block to the binary code assigned to the reconstruction point of the cell, selected on the basis of the pixels themselves.

The simplest vector quantizer is the one comprising a scalar quantizer applied n times to each pixel of the block. The vector quantizer represented here basically comprises a scalar quantizer applied to each pixel in the block with a quantization step calculated in an adaptive way according to the characteristics of the pixels themselves.

The compression technique is, as has been seen, of a lossy type. In fact, the reconstruction point is generally co-ordinated and different from the point corresponding to the n-tuple of starting co-ordinates. The difference is referred to as quantization error.

As will be illustrated in greater detail in what follows, by appropriately designing the vector quantizer, it is possible to obtain the simultaneous reduction in the statistical redundancy and perceptive redundancy of the data, at the same time maintaining a low computational complexity.

A vector quantizer with uniform cells and variable-length code for the reconstruction points achieves a reduction in the statistical redundancy of the data. This is obtained by assigning short binary codes to the reconstruction points belonging to the cells selected more frequently, in a manner similar to what is done in the Huffmann compression technique.

The vector quantizer with non-uniform cells and fixed-length code for the reconstruction points has asymptotically the same performance in terms of reduction in statistical redundancy if it is built in an appropriate manner. In particular, the areas of the multidimensional space most frequently selected are partitioned with cells that are smaller and nearer to each other.

The compression is due to the fact that the binary representation associated to the reconstruction point requires fewer bits that the binary representation of the elements of the vector to be quantized.

As regards the vector quantizer presented herein, after experimental measurements have been carried out, it is noted that, for an n-dimensional space, the cells must be concentrated along the straight line of equation:

$$x_1 = x_2 = x_3 = \ldots = x_n$$

where $x_i$ is the i-th co-ordinate, with i ranging from 1 to n. It is, in practice, the n-dimensional diagonal.

The experimental measurements are justified by the fact that the outlines or edges constitute a small part of the image. In the rest of the image, the intensity of the pixels of the block is approximately uniform, which means that in the multi-dimensional space the corresponding co-ordinate is near the straight line represented by the above equation.

It can moreover be noted that, whilst the number of the pixels of the image increases as $N^2$, i.e., as the square of the length of the side (if the image is assumed to be approximately square, with a side of N pixels), the number of pixels of the edges increases only according to N. On the basis of this observation, it is foreseeable that the vector quantizer thus designed proves increasingly efficient as the image resolution increases.

In other words, as the resolution increases, the percentage of edges decreases. The bigger cells, which are far from the n-dimensional diagonal, with greater quantization error, are selected less on a percentage basis. It may be concluded that the signal-to-quantization noise ratio of the image increases.

On the basis of the premises recalled above, it is possible, once more with reference to a non-uniform vector quantization, to refer to reduction in perceptive redundancy.

As has already been said, the human visual system shows a low sensitivity to the high frequencies contained in the image, which can therefore be quantized in a coarser way.

It is possible to exploit in this way the said property of the visual system by passing to the frequency domain by means of a (DCT or DWT) transform of a block of pixels. This operation usually proves rather burdensome in terms of computational complexity.

A simpler way to exploit said property is based upon operation in the spatial domain instead of the frequency domain.

The above is based upon the fundamental idea of quantizing the images in a coarser manner near the edges, where high frequencies are found: it is, in practice, a masking effect which occurs at the edges.

Quantizing in a coarser way means increasing the quantization step. In effect, the quantization step can be the greater, the sharper the edge, and the sharpness of the edge can be measured in different ways.

For example, if the block contains only two pixels (as in a minimum-complexity implementation) the sharpness of the edge is simply the absolute difference of the light intensity of the two pixels. If the block contains more than two pixels, a simple and rapid measurement may be the absolute difference between the highest intensity and the lowest intensity present in the block.

After the sharpness of the edges has been calculated (according to known criteria, on the basis of the premises indicated above), it is quantized so as to divide the edges into a number of classes. For example, in the case of a block of two pixels, $E = abs(p_1 - p_2)$. If $p_1$ and $p_2$ range from 0 to 255, the sharpness of the edge E ranges from 0 to 255. If E is quantized with a step $E_{SQ} = max(E)/3$, its quantized value is $E_Q = round(E/E_{SQ})$, and four classes of edges are obtained, since $E_Q$ ranges from 0 to 3.

Alternatively, it is possible to use a threshold table for classifying E while assigning the values $E_Q$ accordingly.

The class 0 corresponds to the least sharp edge (flat area), the class 3 corresponds to the sharpest edge. The step of quantization of the pixels of the block is chosen the higher, the sharper is the edge.

The quantization step Q can be read from an indicized table according to the edge class $E_Q$. Alternatively, the quantization step Q can be calculated as a function of the parameter $E_Q$.

For example, we can simply set $Q = m*E_Q + q$ with m and q constant values appropriately chosen. Alternatively, and in one embodiment, we can set $Q = m*(t^{E_Q}) + q$. To maintain a low computational complexity, $q = 0$ and $t = 2$.

More in general, and in an embodiment, the function which enables calculation of Q from $E_Q$ is defined so that the value of Q will be multiplied by an integer value if $E_Q$ increases and will be divided by an integer value if $E_Q$ decreases. This makes it possible to simplify the subsequent calculation of the binary code (block 14 of FIG. 1), to be supplied at output, from the result of the vector quantization (block 13 of FIG. 1).

The vector quantization is then reduced by repeatedly applying a scalar quantizer with a quantization step Q calculated in an adaptive way in order to exploit the effect of masking of the edge. In particular, the intensity of each pixel of the block $p_i$ is quantized as follows: $p_{iQ}$=round $(p_i/Q)$.

The reconstruction level (for inverting the quantization operation block 27 of FIG. 2) is simply set equal to $p_{iR}=p_{iQ}*Q$.

The set of quantized intensities $p_c$) of the block is used for gaining access to a table in which a constant-length or variable-length binary code, associated to the construction level previously identified, is specified. In an embodiment, said code is of constant length.

Alternatively, said binary code is derived via binary arithmetic operations from the binary representations of the quantized block intensities appropriately clustered.

It will be appreciated that the resulting vector quantizer has cells more concentrated along the n-dimensional diagonal. A simultaneous reduction in statistical redundancy and in perceptive redundancy is thus achieved.

A further property of the human visual system is the lower sensitivity as brightness increases. This property is already exploited well by the exponential relation which relates the linear chromatic components to the corrected non-linear ones, with the use of the so-called gamma factor.

The corrected components are the ones normally used. It is experimentally found that said corrected components still in part present the aforementioned perceptive redundancy.

In particular, the mean value M of brightness of the pixels in the block is calculated. This level is quantized with a step $M_{SQ}$ so as to divide the blocks into a number of classes: $M_Q$=round $(M/M_{SQ})$. If, for example, $M_{SQ}$=max $(M)/2$, $M_Q$ may assume the values 0, 1, or 2.

Alternatively, it is possible to use a threshold table for appropriately classifying M, accordingly assigning the values $M_Q$.

The quantization step Q may be increased or decreased by an amount proportional to $M_Q$ via an appropriate constant, thus exploiting the effect of masking of the high light intensity.

Alternatively, it is possible to use a table to derive Q from $M_Q$. It is also possible to calculate Q directly from $E_Q$ and $M_Q$ taken together by means of an appropriate formula or table, the latter usually implemented in the form of a so-called look-up table (LUT).

As has been mentioned previously, the function that enables calculation of Q from $E_Q$ is preferably such that the value of Q will be multiplied by an integer value if $M_Q$ increases and will be divided by an integer value if $M_Q$ decreases.

The resulting vector quantizer, derived from the previous one, has cells more concentrated along the n-dimensional diagonal $(x_1=x_2=x_3=\ldots=x_n)$. In particular, the concentration is higher at the beginning of the diagonal $(x_1=x_2=x_3=\ldots=x_n=c$, with c small) and lower at the end $(x_1=x_2=x_3=\ldots=x_n=c$, with c large).

The vector quantizer thus far described consists in a scalar quantizer applied to each element of the vector to be quantized. The quantization step is identical for all the elements of the vector and is calculated according to the perceptive characteristics of the vector itself: sharpness of the edge, if present, and mean brightness.

The reconstruction points of this vector quantizer are arranged according to an orthogonal lattice, having square cells, in the two-dimensional case, or cubic cells, in the three-dimensional case.

For the two-dimensional case, it is known that the optimal lattice, with cells all the same as one another, is the one with hexagonal cells. The reason is that the maximum quantization error is due to the point which, in the cell, is further away from the reconstruction point. The ideal cell is consequently the circular cell, and the hexagonal cell is the one that best approximates the ideal cell whilst covering completely the space to be quantized.

The quantizer with hexagonal cells can be obtained from a quantizer with rectangular cells, in which the reconstruction points have co-ordinates that increase with a step DX= $(3/2)*L$, DY=$\sin(\pi/3)*L$, with pre-set L calculated in the way already described for the quantization step. The reconstruction points of the rectangular lattice have co-ordinates Qx=n*DX, Qy=m*DY, with n and m integers. The reconstruction points of the hexagonal lattice are a sub-set of these and precisely are the points where o=m+n is even (or else odd).

Alternatively, and in one embodiment, the cell is square. In this case DX=DY=L, with pre-set L calculated in the way already described for the quantization step. If only the reconstruction points where o=m+n is even (or else odd) are considered, a square lattice rotated through 45° is obtained, hence a lattice which basically amounts to a quincunx configuration.

Alternatively, it is possible to use a lattice with hexagonal cells rotated through 45°, in order to align one of the borders of the cells to the n-dimensional diagonal according to which the space to be quantized is partitioned.

The vector quantizer thus far described obtained with a scalar quantizer applied n times (one for each pixel of the block of the image), for which the quantization step Q is calculated in an adaptive way according to the sharpness E of the edge present in the block and according to the mean light intensity M thereof. In this way, the simultaneous reduction of the statistical and perceptive redundancy is obtained.

Such a quantizer can be applied to pixel arrays corresponding to the luminance, the chrominance, or to a given color (R, G, or B).

In the case of chromatic components under-sampled (as in the case of video signals in the formats YUV, YIQ or YDbDr in the 4:2:2 format) and multiplexed (as in the case of the digital video signal YCbCr ITU-R BT.601), the block of pixels must be appropriately treated, re-ordering and demultiplexing the components to which the vector quantizer is to be applied.

Figure 3:
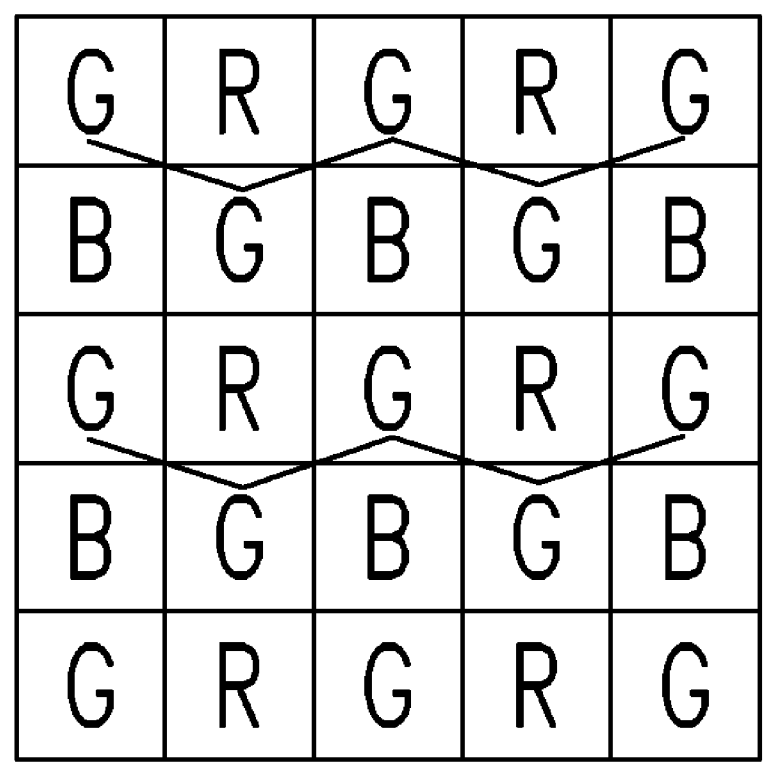

For example, considering a pair of 8-bit pixels corresponding to the same chromatic component, this is replaced by an 8-bit index which identifies one of the reconstruction points which are concentrated about the two-dimensional diagonal. The compression factor is, in this case, 2:1. It is evident that, if 8 bits are used, i.e., $2^8$=256 cells in the two-dimensional space corresponding to each pair of pixels. A particular case is represented by data organized according to a so-called Bayer pattern (see in this regard FIG. 3, which refers to a scanning diagram of the green component of the Bayer pattern for an adaptive DPCM encoding/decoding system).

The data in Bayer format obviously represent an approximation of the chromatic components of a scene that can be acquired by a digital sensor. The final quality of the image is strictly linked to the color reconstruction/interpolation algorithms. When the aim is to implement a compression function it is, however, important, in the case of a lossy compression, to attempt to preserve a high fidelity with respect to the original data. Small alterations could, in fact, alter/worsen the quality of the final RGB image with effects such as false colors, a so-called diffused aliasing, etc. It is thus important to use techniques that take into account the particular structure, exploiting precisely the chromatic correlation of the different channels.

Following, in fact, a global approach of a traditional type (for example, JPEG), the transitions between pixels of different colors would be encoded as high-frequency and consequently markedly altered components. On the other hand, in the case of low-cost applications, the technique must necessarily exploit just a few computational resources, remote reconstruction being envisaged.

In the case of an array containing a Bayer pattern, the block of dimensions 4×2 contains the following scheme of chromatic components:

row 1=$G_1R_1G_2R_2$,
row 2=$B_1G_3B_2G_4$;

using the two-dimensional vector quantizer, the pairs to which said quantizer can be applied are $<R_1, R_2>$, $<B_1, B_2>$ together with $<G_1, G_2>$, $<G_3, G_4>$ or $<G_1, G_3>$, $<G_2, G_4>$.

It is experimentally observed that, if $<G_1, G_2>$, $<G_3, G_4>$ are vector quantized, the quality improves. In fact, in the other case, the pixels that belong to a pair are more distant from one another, and it is less likely for them to have similar intensities, i.e., it is less likely that the point of corresponding co-ordinates is near the diagonal where the quantization is finer and the error smaller.

In the case of images in RGB format, it is usually convenient to perform a change of co-ordinates to the color space YCbCr (or else to any of the similar spaces in which the luminance information is separate from the chrominance information, i.e., YUV, YIQ or YDbDr).

For a general review of the characteristics of said chromatic spaces, as well as the other chromatic spaces to which reference is made in the framework of the present description, useful reference may be made to the following documents:
R. C. Gonzales, R. E. Woods, *Digital Image Processing*, Addison Wesley, 1993;
W. B. Pennebaker, J. L. Mitchell, *JPEG, still image data compression standard*, Van Nostrand Reinhold, 1992; and
D. Taubman, M. Marcellin, *JPEG2000 Image Compression Fundamentals*, The Kluwer Int. Series in Eng. and Computer Science, Volume 642 Hardbound, ISBN 0-7923-7519-X, November 2001).

The chrominance planes are then sub-sampled horizontally (4:2:2 format), or else both horizontally and vertically (4:2:0 format). Possibly, the operation of sub-sampling can be preceded by a low-pass filtering for reducing the aliasing effects, above all in the case of non-progressive multiplexed video material.

The luminance plane is then compressed by applying the two-dimensional vector quantizer to (horizontally or vertically) adjacent pairs of pixels. For example, from row=$Y_1Y_2Y_3Y_4$, we move onto the pairs $<Y_1, Y_2>$ and $<Y_3, Y_4>$, which are then vector quantized. The chrominance planes are processed in a similar way but separately. Alternatively, and in another embodiment, sub-sampling of the chrominance planes is performed according to a quincunx (i.e., checkerboard) configuration, proceeding so that the two chrominance planes can be multiplexed perfectly: row 1=$U_1V_1U_2V_2$, row 2=$V_3U_3V_4U_4$. The vector quantization is then to be applied to the pairs $<U_1, U_3>$, $<U_2, U_4>$ and $<V_1, V_3>$, $<V_2, V_4>$.

Alternatively, but with a slightly lower quality, the following pairs can be used: $<U_1, U_2>$, $<U_3, U_4>$ and $<V_1, V_2>$, $<V_3, V_4>$. The poorer quality is due to the greater spatial distance between the pixels of the pairs, which renders more likely a lower correlation. The pair to be vector quantized is consequently located far away from the multi-dimensional diagonal and is quantized with a higher quantization error.

The above checkerboard sub-sampling lattice proves to be more isotropic as compared to the 4:2:2 case, in so far as it does not give preference to the horizontal edges. In addition, perfect multiplexing between the components causes a chrominance component always to be associated to each luminance pixel, instead of having alternately pixels for which the set YUV is specified and pixels for which only the value Y is specified. This enables a reduction of the artifacts due to the subsequent step of interpolation and reconstruction of the original RGB image.

As has been seen, vector quantization of multiplexed chromatic components is obtained by grouping each component in the block into a vector of appropriate size and quantizing it separately. In an embodiment, the vector has a minimum size of 2.

If the aim is to decompress the image, the binary code in the reconstruction point (supplied at output from block 26 of FIG. 2) must be replaced with the co-ordinates of the point itself. In the case of sub-sampled and multiplexed chromatic components, it is then necessary to separate the components (demultiplexing) and interpolate.

It is experimentally found that the vector-quantization error gives rise to visible colored patterns. This occurs above all in the uniform areas of the image. The cause is to be chiefly attributed to the interpolation method which necessarily makes use of adjacent pixels that are of the same chromatic component but are affected by repeated and regular quantization error.

A possible solution of the problem involves trying to introduce the so-called dithering in order to brake the regularity of the quantization error.

In practice, a (low) level of noise is intentionally added so as to prevent the colored pattern. The disadvantage is that the quality of the image is slightly reduced in so far as the image appears slightly granular.

A second possible solution involves applying noise-shaping techniques, taking into account during quantization the previous quantization error. The disadvantage of this solution lies in the fact that the complexity of the quantizer increases (albeit slightly).

A particularly advantageous solution involves envisaging for the uniform areas (i.e., the areas with E=0) the finest possible quantization with the minimum quantization step (Q=1).

For instance, developing the example seen previously (passage from RGB to modified YCbCr), for each pair $<c_1, c_2>$, if $c_1=c_2=c$ (8 bits), then the sequence of bits "1" plus 8 bits for c is sent; otherwise, if c1 is other than c2, the sequence of bits "0" plus 8 bits corresponding to the index VQ ($c_1c_2$) is sent. In all, we pass from the 16 bits of the pair $<c_1, c_2>$ to 8 bits.

The above solution falls, of course, within the vector quantizer scheme outlined previously. In fact, setting the quantization step to the minimum (Q=1) for the uniform areas (where E=0) means that the reconstruction points of the vector quantizer, in addition to being concentrated near the n-dimensional diagonal, are also located on the diagonal itself. This is important for preventing visible colored patterns.

The above patterns belong, moreover, to the category of artifacts for which the standard measurements of quality (such as the PSNR factor) do not correspond to the perceived quality. In fact, standard measurements of quality are based upon the intensity of the artifact and do not take into account the influence thereof on the visual system. In the present case, the patterns in question have a low intensity but, since they are regular, they may appear clearly visible and hence perceivable by the user.

The vector-quantization or multidimensional-quantization operation described herein involves passing from the binary representation of the intensity of the pixels contained in the block to the binary code assigned to the reconstruction point of the cell selected according to the pixels themselves.

From another point of view, it may be stated, with substantial adherence to the actual situation, that the block of pixels is encoded as a sort of single "superpixel" having an intensity specified by the binary code associated to the selected reconstruction point.

Experimentally, a residual statistical redundancy of the data is found, which can be further reduced in a lossy way by applying once again the solution presented herein or else in a lossless way by concatenating one of the entropic-compression methods already presented.

The efficiency of the iterated lossy compression basically depends upon the way in which the binary codes are assigned to each reconstruction point. In particular, considering two reconstruction points, the assignment must be made in such a way that corresponding to a smaller distance in the n-dimensional space there will be a smaller difference in the related binary values. Assuming that such an assignment has been carried out, it is understandable that a superpixel has a value similar to that of the adjacent ones, precisely on account of the residual statistical redundancy. The superpixels can therefore be introduced in multi-dimensional and quantized vectors with a procedure similar to the one already illustrated.

With reference once again to the example of the Bayer pattern, in the case of multiplexed chromatic components we pass from a Bayer pattern to a super Bayer pattern. In fact, each 4×2 block of the starting Bayer block (row $1=G_1R_1G_2R_3$, row $2=B_1G_3B_2G_4$) is encoded in a 2×2 superpixel block (row 1=G'R*, row 2=B*G"), by means of the two-dimensional vector quantization (R*=VQ<$R_1$, $R_2$>, B*=VQ<$B_1$, $B_2$>, G'=VQ<$G_1$, $G_2$>, RG"=VQ<$G_3$, $G_4$>).

There is the evident possibility of iterating the method on the super Bayer pattern thus obtained. From the point of view of vector quantization, this means increasing the size of the vector quantizer, since operation is carried out on blocks which refer to increasingly larger portions of the original data array.

It is moreover evident that it is possible to iterate the compression also in the case of the modified YCbCr.

To attain a further reduction of the residual statistical redundancy it is possible to resort to an entropic encoding.

By way of example, the simplest method involves identifying adjacent superpixels with the same value. This sequence of superpixels is then reduced to a single sample of the superpixel, preceded or followed by a count indicating the number of repetitions. It is, in other words, an application of the technique known as run-length encoding (RLE).

The application of more advanced methods is more effective with an appropriate assignment of the binary codes and the reconstruction points (block 26 of FIG. 2). In particular, optimal assignment of the codes follows the rule already illustrated previously.

Taking two reconstruction points, the assignment must be performed so that corresponding to a smaller distance in the n-dimensional space will be a smaller difference of the corresponding binary values.

Assuming that such an assignment has been made, it may be appreciated that the value of a superpixel can be predicted according to the value of the adjacent superpixels. In the simplest case, the value of the superpixel is predicted according to the value of the preceding one. The prediction error is then encoded with a technique which can basically be identified as a DPCM technique to which the diagrams of FIGS. 1 and 2 refer.

At a distance from the edges (and, consequently, probably for the majority of the superpixels), the prediction error is small. Small values of this error can then be classified with short binary codes, whereas large values will have long binary codes, in a way similar to what has been seen in relation to Huffmann compression.

Of course, in the case of multiplexed chromatic components, the simplest prediction of a given superpixel is made on the basis of the value of the nearest superpixel belonging to the same chromatic component.

In more complex cases, instead, the prediction of a chromatic component can be made on the basis of adjacent superpixels belonging to another chromatic component (as is normally the case in the methods of chromatic interpolation).

For example, in the particular case where the encoded data are in the Bayer format, a slight modification in the prediction scheme of a DPCM type enables improvement of performance in the case of encoding of the green component.

In a Bayer pattern, in fact, the green pixels are present on each row, whilst the blue and the red ones are distributed on alternate rows. Consequently, the fact that continuous green pixels belonging to successive rows are nearer in space than adjacent pixels on the same row results in a higher correlation, which, in turn, involves lower prediction errors, at least in the case of areas of images in which sharp edges are not present.

A prediction scheme following a "zigzag" order, in the calculation of the errors, enables a slightly better compression as compared with the classic scheme, both in the case of lossless compression and in the case of lossy compression.

The degree of such an improvement (to which FIG. 3 makes specific reference) depends upon the characteristics of the image and increases as the resolution increases.

Table 1 appearing below gives the mean results obtained on databases of images in Bayer pattern, which have different resolutions and are compressed using both the adaptive DPCM-type approach, which has just been described (I-DPCM), and the classic approach (Standard DPCM or std DPCM).

| | | Bit rate compression performance (expressed in bpp) | | | | | | |
|---|---|---|---|---|---|---|---|---|
| Resolution | algorithm | lossless | q = 2 | q = 4 | Q = 8 | q = 16 | q = 24 | q = 32 |
| 352 × 288 | std DPCM | 4.79 | 3.83 | 2.96 | 2.19 | 1.65 | 1.45 | 1.33 |
| | I-DPCM | 4.67 | 3.73 | 2.85 | 2.10 | 1.58 | 1.40 | 1.29 |
| 640 × 480 | std DPCM | 4.96 | 4.04 | 3.14 | 2.39 | 1.81 | 1.57 | 1.43 |
| | I-DPCM | 4.87 | 3.95 | 3.06 | 2.31 | 1.71 | 1.54 | 1.40 |

-continued

| Resolution | algorithm | Bit rate compression performance (expressed in bpp) | | | | | | |
|---|---|---|---|---|---|---|---|---|
| | | lossless | q = 2 | q = 4 | Q = 8 | q = 16 | q = 24 | q = 32 |
| 1000 × 800 | std DPCM | 3.57 | 2.74 | 2.07 | 1.62 | 1.34 | 1.24 | 1.18 |
| | I-DPCM | 3.44 | 2.62 | 1.98 | 1.55 | 1.30 | 1.21 | 1.15 |

In the table, the value q designates the step used in the lossy compression obtained via uniform quantization.

Concatenating the lossless DPCM encoding system to the approach based upon vector quantization, it is possible to obtain a better compression without any loss in quality of the output.

Although the vector quantizer operates satisfactorily with any type of image from the perceptive point of view (subjective quality evaluation), it is possible to improve the objective performance thereof (for instance, in terms of Peak Signal-to-Noise Ratio or PSNR) in the case of images with sharp edges: a typical example is represented by images created artificially on the computer, cartoons, text pages introduced via scanner or other means.

To obtain this improvement, the function that calculates the quantization step Q according to the sharpness of the edge E and of the mean level of brightness M is modified. In particular, Q is chosen small when E is maximum (sharp edge). In practice, Q is not simply made to increase with E and M as seen previously but Q reaches a maximum at an intermediate value of E.

This means that the reconstruction points of the quantization lattice are arranged in the corners far away from the multi-dimensional diagonal. These corners belong to the multi-dimensional cube, in which the vector that corresponds to the n-tuple of co-ordinates corresponding to the pixels in the block comes to be located.

Alternatively (and in addition to the strategy just illustrated for the calculation of Q), it is possible to cause Q to be small when one of the pixels in the block has the maximum or minimum allowable value. This means that the reconstruction points of the quantization lattice are set not only on the corners distant from the multi-dimensional diagonal, but also along the sides of the multi-dimensional cube in which there the vector that corresponds to the n-tuple of co-ordinates corresponding to the pixels in the block comes to be located.

Figure 4:
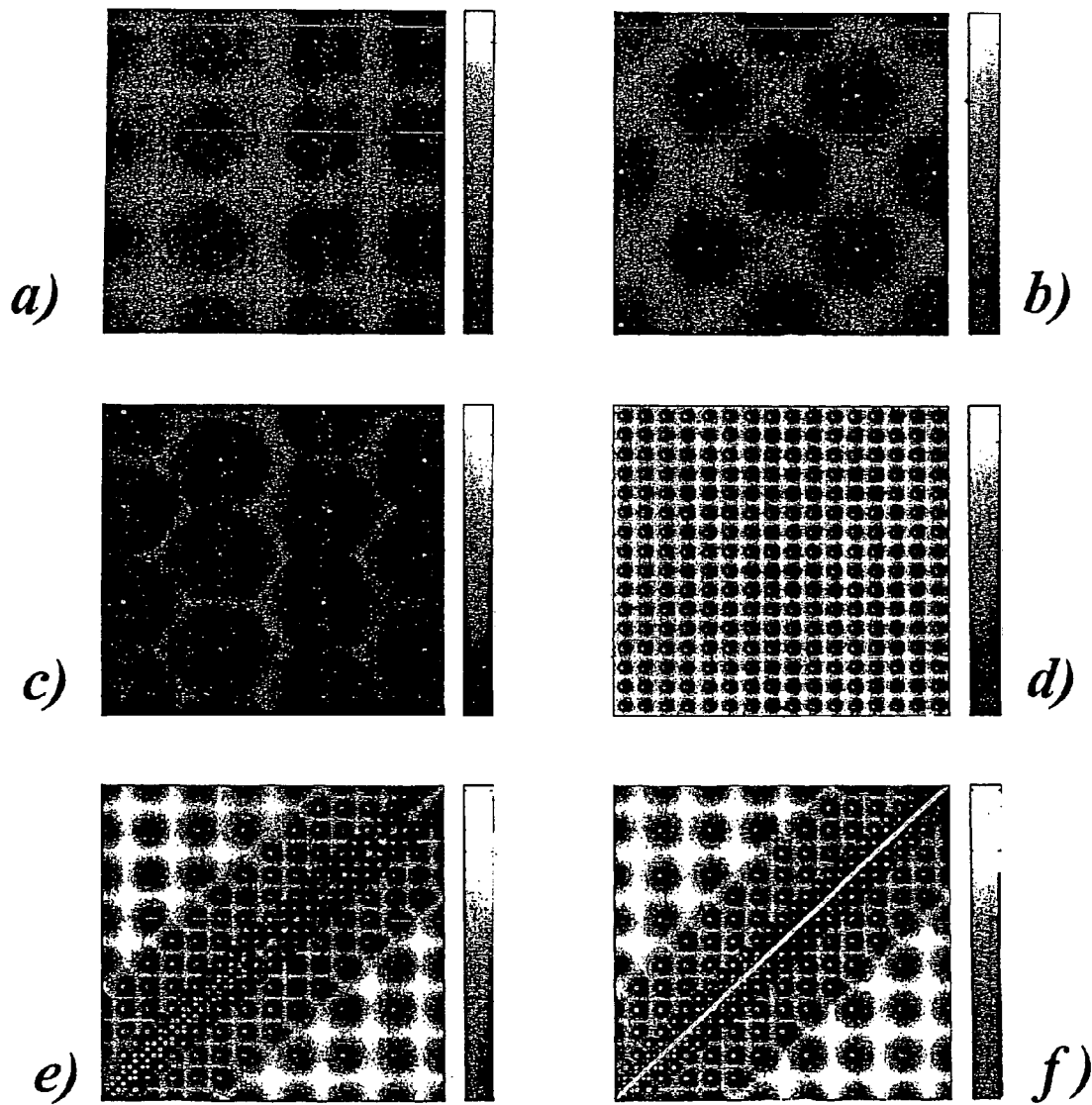
FIGS. 4 to 7 represent various examples of application of the solution according to embodiments of the invention.

The graphs of FIGS. 4a to 4f reproduce examples of reconstruction-point lattices and quantization cells for two-dimensional vector quantizers. In particular, the graphs in question (the scales of which, both on the abscissa and on the ordinate, are of themselves irrelevant) refer respectively to a square lattice (FIGS. 4a, 4b) and to a hexagonal lattice (FIG. 4c).

FIGS. 4d, 4e and 4f refer, instead, to error values found respectively with a Q scalar quantizer, a Q vector quantizer and an optimal Q vector quantizer.

The images of FIGS. 5a to 5d are demonstrate the performance of a generic two-dimensional vector quantizer applied to 2×1 blocks of an array containing luminance (compression factor 50%, from 8 bpp to 4 bpp) as compared with a scalar quantizer.

Figure 5:
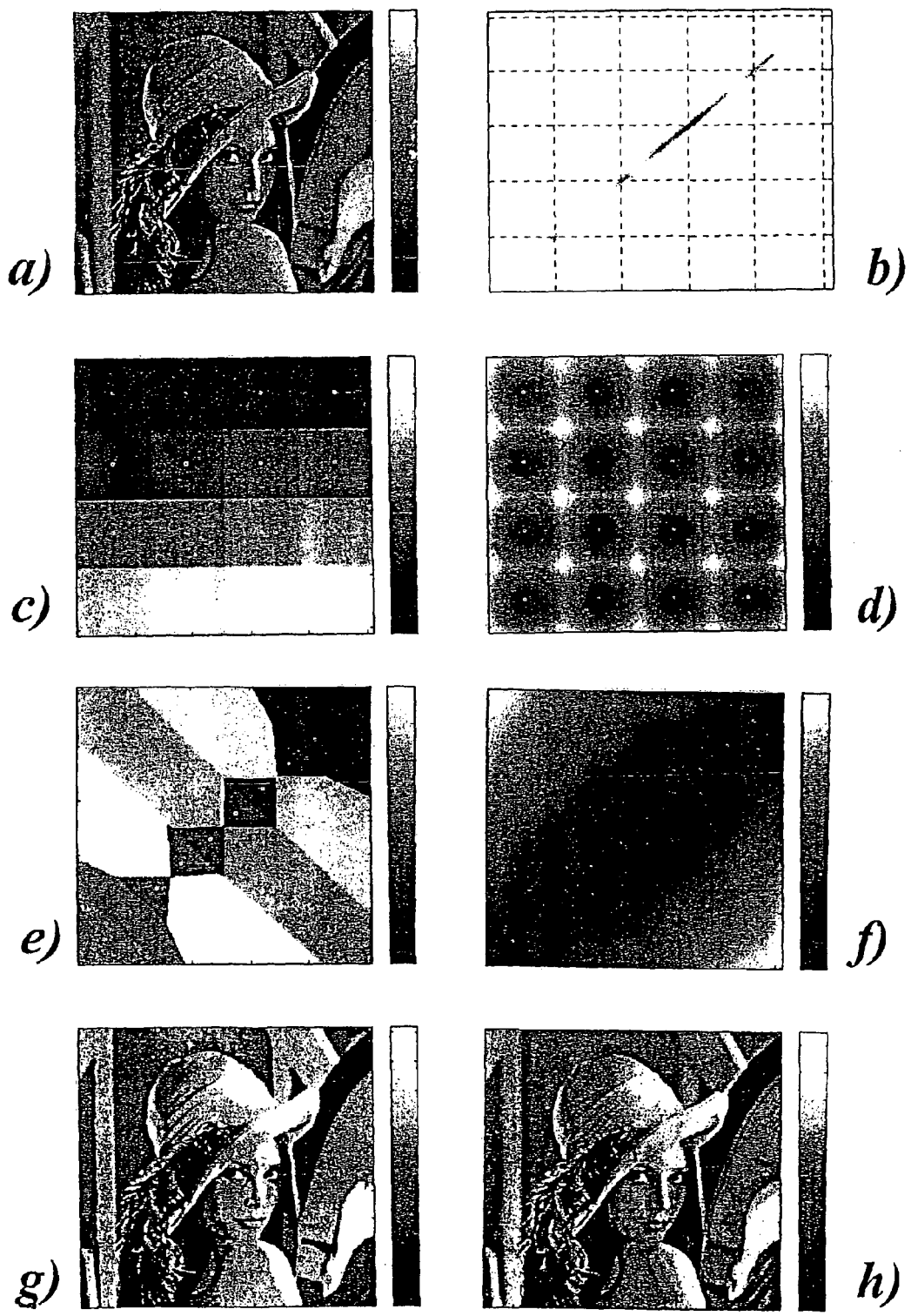

In particular, FIG. 5a illustrates an 8-bit/pixel image, whilst FIG. 5b shows the 2Q statistics for a 2×1 block.

FIG. 5c illustrates the distribution of the cells of the reconstruction points, whereas FIG. 5d illustrates the map of the quantization error.

FIGS. 5e and 5f reproduce the cells and the reconstruction points, as well as the quantization error with reference to FIGS. 5g and 5h, which reproduce images on four bits per pixel obtained after quantization with uniform 2Q quantizer and non-uniform 2Q quantizer.

FIGS. 6a to 6l demonstrate the performance of a two-dimensional vector quantizer built according to the modalities described previously and applied to 4×2 blocks of an array containing chromatic components multiplexed according to the Bayer pattern (compression factor 56%, from 8 bpp to 4.5 bpp) as compared with a scalar quantizer and a vector quantizer without points along the multi-dimensional diagonal.

Figure 6:
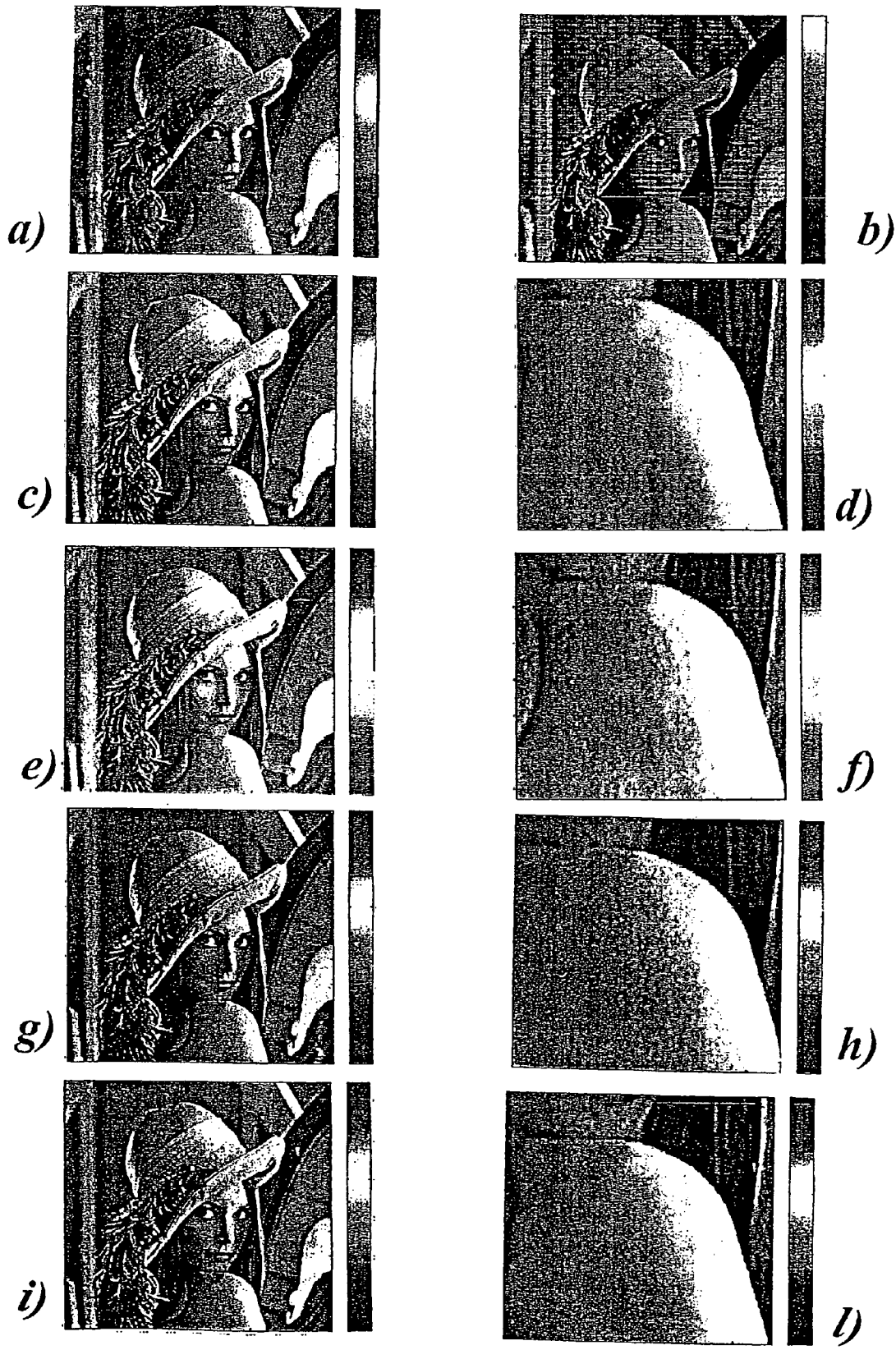

In particular, it is assumed that the starting point is a 24-bit/pixel RGB image (FIG. 6a), to which there corresponds the Bayer pattern on 8 bits/pixel reproduced in FIG. 6b.

FIG. 6c illustrates the RGB image reconstructed from the Bayer pattern, and FIG. 6d reproduces a part of the same image at an enlarged scale.

FIGS. 6e and 6f illustrate, by way of comparison, the RGB image reconstructed from a Bayer pattern compressed with a scalar quantizer, whereas FIGS. 6g and 6h refer to the RGB image reconstructed from a Bayer pattern compressed with a vector quantizer.

FIGS. 6i and 6l refer to an RGB image reconstructed from a Bayer pattern compressed with an optimal vector quantizer.

Figure 7:
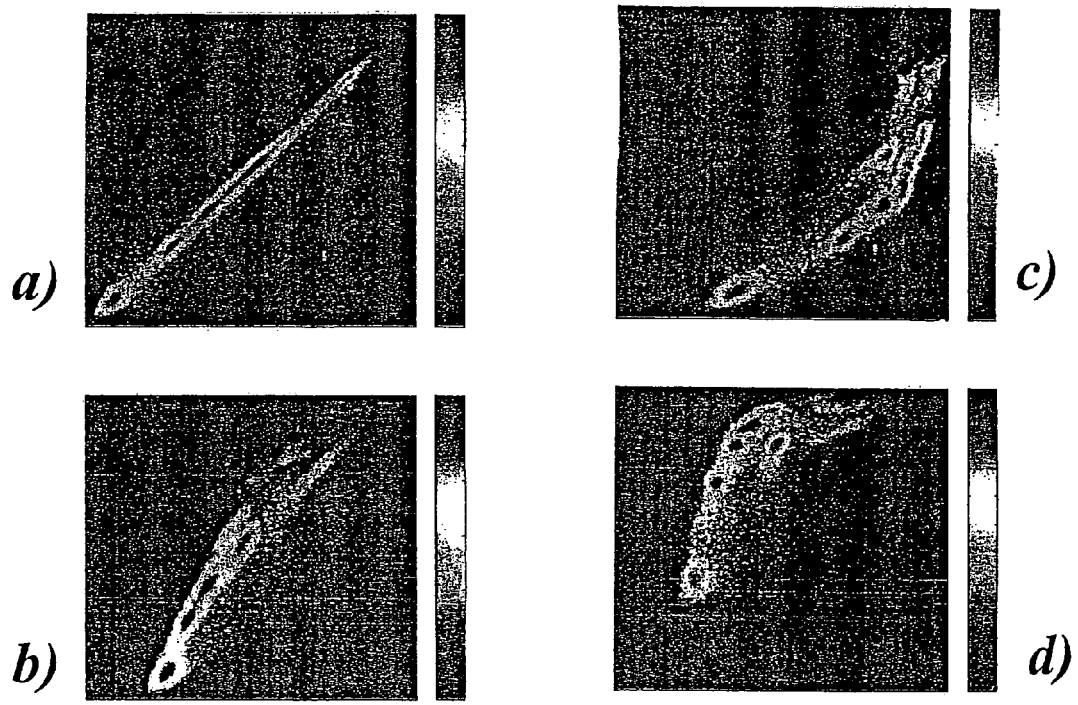

FIG. 7a shows the strong correlation between the $G_1$ (abscissa) component and the $G_2$ (ordinate) component of the Bayer pattern. It is observed that the $<G_1, G_1>$ pair is set along the two-dimensional diagonal of the quantization space and is quantized with a small quantization error.

It appears clearly, instead, that this does not occur for the $<G, R>$ pair (FIG. 7b), for the $<G, B>$ pair (FIG. 7c) and for the $<R, B>$ pair (FIG. 7d). For these pairs, the result of the perceptive vector quantization would therefore be affected by a larger quantization error.

It is emphasized that, also in relation to FIGS. 7a to 7d, as for FIGS. 4a-4f; 5a-5h, and 6a-6l, the exact definition of the scales is not in itself relevant.

The above described procedures allow for compression of Bayer pattern data, thus each color ideally yields a different distribution in the bidimensional space.

The full encoding procedure, as already mentioned in the foregoing, includes thus two steps:
  partitioning the bidimensional space into cells of different size in order to exploit difference in brightness and edge. Each sample of the space is quantized by a single point of its cell, known as "reconstruction point," which is the center of the cell itself;
  assigning a binary code to each reconstruction point.

Such full encoding procedure allows for representing each pair of input pixels using 11 bits, if a 10-bit Bayer pattern is used.

The space partitioning operation is performed in three phases:
  luminance classes definition: such a phase is used to capture the high 'luma masking' effect, i.e., the property of the human visual system that shows a lower sensitivity as brightness increases;

edge classes definition: such a phase is used to capture the 'edge masking' effect, i.e., the already mentioned masking effect which occurs at the edges;

quantization: such a phase includes adaptive quantization of the pixels pairs.

For the luminance classes definition, the full encoding procedure provides for partitioning space into luminance classes. As already mentioned, it is possible to use a threshold table for appropriately classifying brightness or luminance M, accordingly assigning the values of classes $M_Q$, ($M_0$, $M_1$, ..., $M_{m-1}$). Each class $M_i$ is delimited by the following equations:

$$y=-x+a_j; \text{ and } y=-x+a_{j+1},$$

where $a_j \epsilon [0, 2048]$ with j integer class index. Values $a_j$ are luminance thresholds used to find the class corresponding to each pair (x, y) of pixel values to code. A set of luminance thresholds, in the 10-bit Bayer pattern embodiment here described, is:

$a_0=384; a_1=1152; a_2=1920; a_3=2048$.

The luminance classes are thus:
$M_0=[a_0, a_1[$
$M_1=[a_1, a_2[$
$M_2=[a_2, a_3[$ A luma_class(x,y) function is defined, for finding the class index j of a pair (x,y) according to the following condition:

$$\text{luma\_class}(x,y)=M_j \text{ if}(x+y)\epsilon[M_j, M_{j+1}[$$

Figure 8:
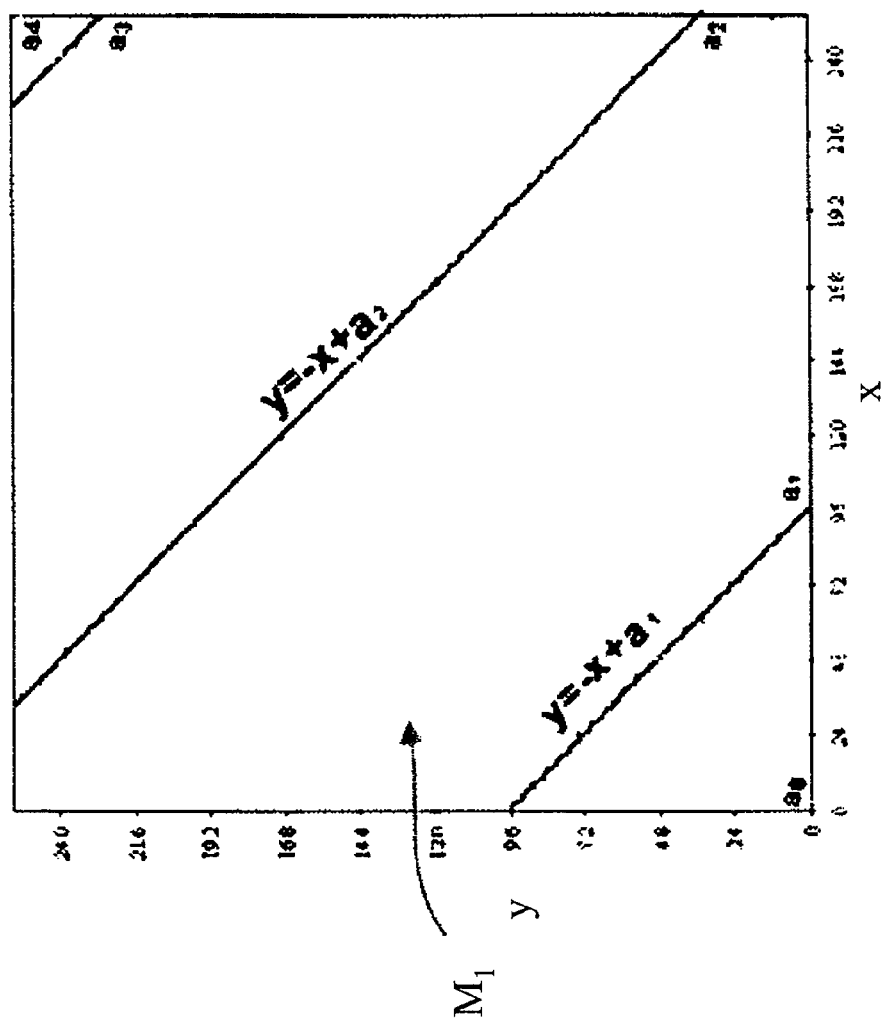
FIGS. 8 to 11 represent further examples of application of the solution according to embodiments of the invention.

In FIG. 8 the space partitioning into luminance classes is shown.

Each class $M_i$ is then partitioned in edge classes $E_{0j}$, $E_{1j}$, ..., $E_{nj}$.

Each edge class is delimited by the following equations:

$$y=x+b_{i,j}; \text{ and } y=x+b_{i,j+1};$$

where $b_{i,j} \epsilon [0, 1023]$ with i integer class index

As for the previous phase, values $b_{i,j}$ are edge thresholds used to find the class corresponding to each pair (x, y) of pixel values to code. In Table 1 an array of example edge thresholds $b_{i,j}$ for the proposed 8-bit quantizer are shown.

TABLE 2

| $b_{i,j}$ | 0 | 1 | 2 | 3 | 4 |
|---|---|---|---|---|---|
| 0 | 8 | 112 | 208 | 400 | |
| 1 | 8 | 88 | 232 | 1000 | 1024 |
| 2 | 4 | 48 | 192 | 893 | |
| 3 | 8 | 8 | 125 | — | |

Figure 9:
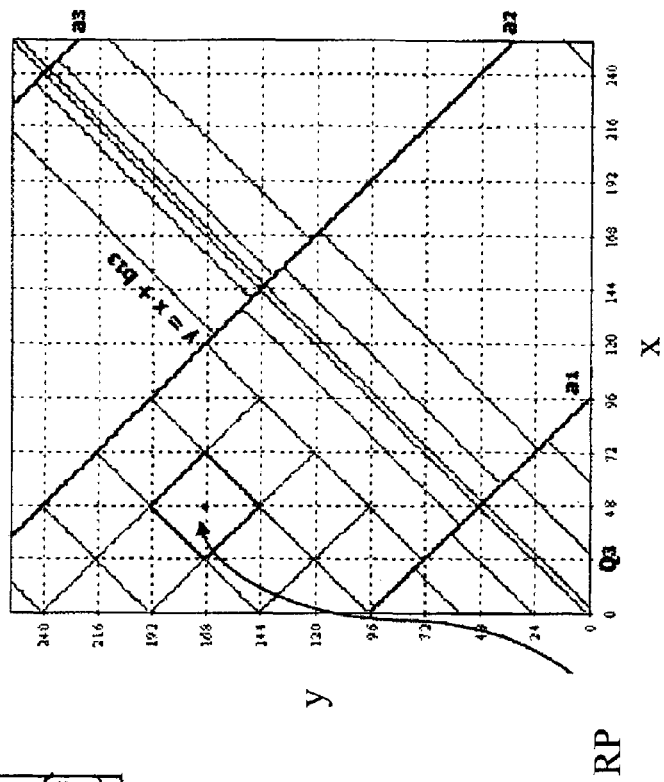
Figure 10:
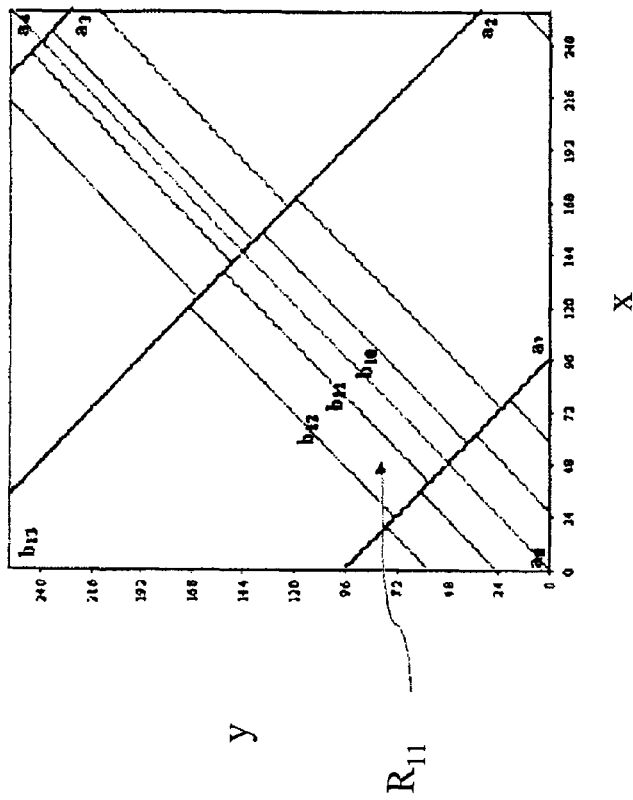

The result is a bidimensional histogram, shown in FIGS. 9 and 10, partitioned into regions or cells $R_{i,j}=M_j \times E_{ij}$. Each of such regions $R_{i,j}$ is quantized with a respective step $Q_j$, depending on its class. All pixel pairs falling in regions $R_{i,j}$ are associated to the same reconstruction point RP, as shown in FIG. 10.

In one embodiment, the following quantization steps Qj define the quantizer:

$Q_0=4; Q_1=8; Q_2=16; Q_3=48; Q_4=14$

The lower values of the quantization step $Q_4$ depends from the fact that, for very high value of brightness the human eye becomes again very sensitive to variations due to the introduced error.

It can be observed that the quantization steps are chosen as submultiples of the size of the regions or cells $R_{i,j}$, in order to avoid overlapping cells.

The full encoding procedure, that computes a x-coordinate Qx and a y-coordinate Qy, i.e., the quantized coordinates of the quantized vector, of the reconstruction point RP starting from a pixel values pair (x,y) includes the following steps:

1) computing of a luma level a=x+y;
2) computing of an edge level b=|x−y|;
3) finding luma threshold values $a_i$ as a function of luma level a;
4) finding edge threshold values $a_{i,j}$ as a function of edge level b;
5) quantization in a quantized luminance value a' of luma level a:

$a'=a_j+[(a-a_j)/Q_j]/*Q_j+Q_j/2$;

6) quantization in a quantized edge value b' of edge level b:

$b'=b_{ij}+[(b-b_{ij})/Q_j]/*Q_j+Q_j/2$;

7) computing the x-coordinate Qx of the reconstruction point RP:

$Qx=(a'-(b'+b_{ij})/2$ 8) computing the y-coordinate Qy of the reconstruction point RP:

$Qy=(a'+(b'+b_{ij})/2$

In steps 3) and 4), substantially the luma_class and luma_edge functions described in the foregoing are applied.

A final step of the full encoding procedure is then the binary codes assignment, in which a table is provided, that contains, organized in rows, binary codes BC, the x-coordinate Qx, the y-coordinate Qy. A look-up table having 1023 16 bit entries is used for retrieving the 11-bit binary codes BC. The 11-bit binary code BC, as already mentioned in the foregoing, is called "super-pixel" and constitutes a representation the reconstruction point RP, or (Qx, Qy). Binary codes can be assigned using a dichotomic search strategy on the sorted reconstruction points set, i.e., the codebook.

In order to number and sort the reconstruction points RP as a function for their distance from the origin of the histogram and their mutual distance, making compression more efficient, a key function f is used such that:

$$f(Qx,Qy)=2^{k}*Qx+Qy$$

with k=bit depth of the image, in this case having the value 10, since 10-bits images are processed. The binary code BC is the index of the look-up table having f(Qx,Qy) as value.

Figure 11:
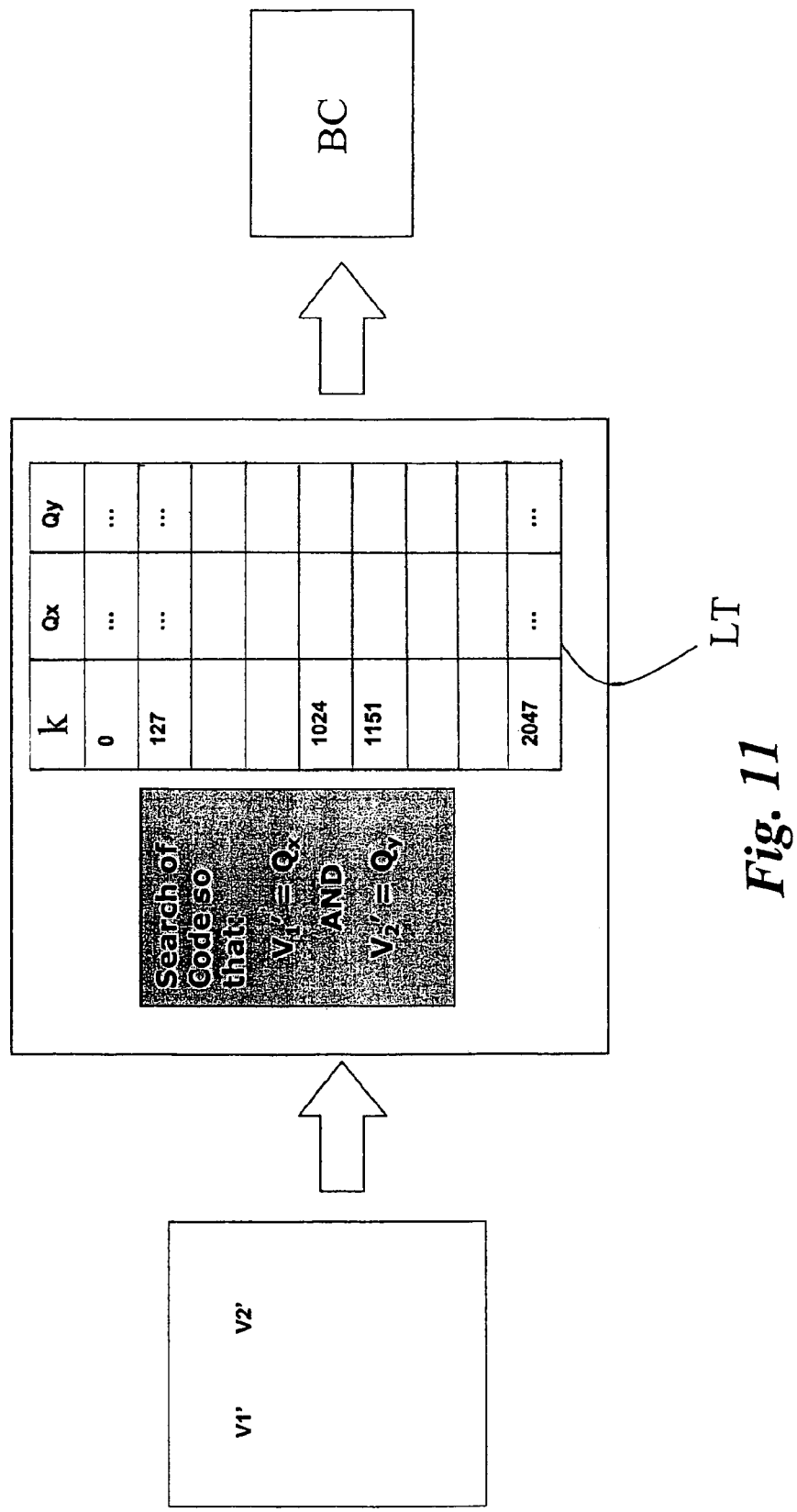

In FIG. 11, the code retrieval procedure is shown, where the quantized vector, expressed through quantized coordinates V1', V2', is the input of a look-up table LT, that contains three columns, one for the code BC, one for the x-coordinate Qx and one for the y-coordinate Qy. Search of the binary code BC is performed so that V1'=Qx and V2'=Qy.

Now, a further embodiment of the encoding procedure, suitable for reducing the memory occupation, with respect to the above described full procedure, will be described.

Such a different encoding procedure, in the following referred as "reduced coding procedure," is based on the following considerations. FIG. 12a shows a bidimensional histogram of the quantization step Q, calculated in an adaptive way according to the sharpness E of the edge present in the block and according to the mean light intensity M thereof. On one axis of such a bidimensional histogram is thus has a first pixel value y pertaining to the intensity, or brightness, of a first pixel in a chosen pixel pair, and on the other axis is a second pixel value y pertaining to the intensity of a second pixel in the pixel pair. Such a bidimensional histogram thus includes a reconstruction points RP lattice and the quantization cells $R_{ij}$ for bidimensional vector quantizers. The histogram, and therefore the associated quantization table, has a symmetric distribution around a symmetry element that is a line DG formed by equal luminance values of the pixels pair, in practice the diagonal of the histogram.

The reduced encoding procedure provides for considering a reduced space corresponding to only a part of the histogram, that is associated to half of the quantization table. Such a part corresponds for instance to a upper part UP of the lattice, as shown in FIG. 12b. This implies that almost half of the codebook represented in the look-up table LT of FIG. 11, associated to the eliminated half of the lattice, and thus of the quantization table, is spared. Further the reduced coding technique provides for coding all the quantized vectors using such a reduced space.

A simple criterion for performing such a reduced coding procedure can then be outlined:
- if the first pixel value x is lower than the second pixel value y, a procedure corresponding to the full encoding procedure is used, searching these quantization values in the quantization table, or more precisely, in the reduced space;
- if the first luminance value x is greater than the second pixel value y, the corresponding vector would falls in the non coded region, outside the reduced space corresponding to the upper part UP of the lattice. Then, a swap operation is executed, i.e., a symmetrical permutation so that the first pixel value x is exchanged with the second pixel value y, or vice versa. In this way the pixel values x and y are remapped in the coded area corresponding to the reduced space and a bit, called "Inversion Flag" IF, is set to logical one to keep track of such swap operation having taken place.

Thus, by such reduced coding technique a reduced code RC, corresponding to a reconstruction point RP, is formed in two parts: by the inversion flag IF, that indicates if the swap has occurred or not, and by ten remaining code bits CB, that are used as index in a shorter table. It is to be mentioned in this regard that the normal binary codes BC associated to reconstruction points use eleven bits for 10-bit Bayer patterns.

The bit mapping of such reduced code is shown in FIG. 13.

In order to reduce the memory size of the table devoted to store the codes, all the reconstruction points are stored in a reduced table with two fields. The first field of such a table comprises the x-coordinate Qx of the reconstruction points; the second field comprises the y-coordinate Qy of the reconstruction points. The quantized values V1', V2' are compared with the fields of the table and the position of the point equal to the quantized value yields the eleven bits reduced code RC.

In a first unoptimized implementation for 10-bit Bayer patterns, each quantization table is composed by 4084 elements of 10 bits. The memory amount involved in this case is thus 40840 bits (40 Kbits).

As already mentioned, considering that the position of the reconstruction point is symmetrical with respect to the diagonal line DG in the histogram, defined by Qx=Qy, the quantization table is reduced and the table for the code assignment is rearranged considering the first upper half of the table, corresponding to the upper part UP indicated in FIG. 12b, symmetrical with respect to the second lower half.

More in general, if a point, indicate by the pixel values pair (x, y), corresponds to the reconstructed point RP indicated by the coordinates (Qx, Qy), the point (y, x) will correspond to the reconstructed point (Qy, Qx). Such a symmetry can be exploited in order to reduce the data amount, by storing only the (Qy, Qx) values of the reconstruction points RP whose corresponding points have the pixel value x greater than pixel value y and by then retrieving the remaining cases by swapping the pixel value x with the pixel value y. A bit in the code word will indicate if the pixel value x is greater than pixel value y.

The full quantization table, suitably reordered, is shown in the following Table 3:

TABLE 3

| Index | Qx | Qy | Comment |
|---|---|---|---|
| 0 | | | 128 pixel pairs with Qx = Qy |
| 127 | | | |
| | | | Qx < Qy |
| 1024 | | | 128 pixel pairs with Qx = Qy |
| 1151 | | | |
| | | | Qx > Qy |
| 2047 | | | |

The part with index from 1151 to 2047 in the full table can be then discarded because its information can be reconstructed from the information in the fields indexed from 128 to 1023.

The new reduced quantization table result as follows:

TABLE 4

| Index | Qx | Qy | Comment |
|---|---|---|---|
| 0 | | | 128 pixel pairs with Qx = Qy |
| 127 | | | |
| | | | Qx < Qy |
| 1024 | | | 128 pixel pairs with Qx = Qy |
| 1151 | | | |

As mentioned, an inversion flag bit IF in the code word will indicate the pixel value x is greater than the pixel value y.

The quantity of memory needed by the reduced procedure is 23040 bits (22.5 Kbits, 2.81 Kbytes). The memory used is 56% of the memory used in the implementation corresponding to Table 3. This optimization involves modification of the encoding procedure. The reduced encoding procedure will be better detailed in the following.

Now an embodiment of the reduced encoding procedure will be better detailed along with an evaluation of the computational cost that involves.

The reduced encoding procedure steps can be described, using a pseudocode form, as follows:

Code (x, y, k)
1) If (x>y)
   i. Y1=y;
   ii. Y2=x;
   iii. Swap_flag=1;
2) Else
   i. Y1=x;
   ii. Y2=y;
   iii. Swap_flag=0;
3) a=Y1+Y2;
4) b=|Y1−Y2|;
5) i=luma_class(a);
6) j=edge_class(b);
7) Quantization_ab (a, b, l, j, a', b');
8). Qx=(a'−b')/2;
9) Qy=(a'+b')/2;
10) k=Code_value (Qx, Qy, Swap_Flag);
End procedure The input variables are pixel values x and y, stored in corresponding variable Y1, Y2, while k indicates the k-th code that is outputted by above outlined reduced procedure.

The steps 1) and 2) of the above described procedure indicate the swap operation needed to have in variable Y1 the lowest value and in variable Y2 the highest value. If the pixel value x is greater than the pixel value y then a Swap_flag variable, corresponding to the inversion flag bit IF, is set to logical one to indicate such an inversion operation on values. The computational cost of these operations amounts to one comparison.

The steps 3) and 4) of the pseudo-code illustrating the reduced procedure describe the operation needed to assign the luma level a, and the edge level, indicated by b, to the currently processed pixel values pair (x,y). The computation cost of these operations accounts to two sums and one absolute value computation.

The steps 5) and 6) call the functions luma_class(a) and edge_class(b) needed to find correct indexes i,j of the values of luma threshold $a_j$ and edge threshold $b_{i,j}$ needed to find the region of the two-dimensional histogram containing the reconstruction point associated to the pixel values pair (x,y). Since luma threshold $a_j$ and edge threshold $b_{i,j}$ values are stored into a look-up table, they are found by simple comparison operation. There are five luma threshold $a_j$ values, thus four comparisons are needed to find the correct value. For a fixed value of the j index, in the worst case, five more comparisons are needed to find the corresponding edge threshold $b_{i,j}$.

Thus the computation cost of steps 3) and 4) amounts to nine comparison operations.

Step 7) calls the procedure described above to quantize the values of luma level a and edge level b. The computational cost of these operations is of 18 sum operations, 18 shift operations and 8 comparisons.

Computation of the final coordinates, performed in steps 8) and 9) of the pseudo coded procedure, needs two sum operations and two shift operations.

At step 10) there is the generation of the code searching the quantized values of the coordinate x and y in the table. The code is found by a dichotomic search into the codebook. The dichotomic search allows to find the code in log2(N) steps in the worst case, N being the size of the codebook. In one embodiment, if the values are equal, the search is performed on two tables of 128 elements. If the values are different the search is done on a table of 896 elements.

If the Swap_flag variable is set to one the MSB of the 11 bit reduced code RC is set to one else the value remains zero.

Thus, to complete step for the generation of the code eleven comparison operations are needed.

The whole computation cost of the encoding reduced procedure is, for each pair of pixels to quantize:

22 sum operations
1 absolute value operation
20 shift operations
29 comparison operations The computational cost for each pixel is one half of the figures showed above since they refer to each pixel pair.

The decoding procedure associated to the reduced encoding procedure, expressed as pseudocode, is:

Decode(k, x, y)
1) if(k<1152)
   a. x=Qx_Table(k)[0];
   b. y=Qy-Table[k][1];
2) else
   a. k=k AND (NOT1024);
   b. y=Qx_Table [k][0];
   c. x=Qy_Table [k][1];
End procedure Code k is the input in this case, while pixel values x and y are the outputs.

Such a decoding procedure substantially corresponds to accessing, through suitable functions Qx_Table and Qy_Table, a table where are stored the quantized pairs of coordinates Qx and Qy. The code supplies the index of the table entry to be read. If the code is lower than 1152, no further elaboration is needed and only the value in the table must be read.

If the value is greater than 1151, the first bit is to be set to 0, the output pair is read from the table as in the previous case and then a swap between the output values is performed.

The computational cost of the decoding procedure is of one comparison operation and one logical AND operation.

The memory requirements of the reduced encoding procedure and of the associated decoding procedure are determined by the size of tables used to store the data needed for computation. Summarizing, the encoding procedure uses the following data:

luminance thresholds $a_j$ with j=0, ..., 4;
edge thresholds $b_1$, with i=0, ..., 3; j=0, ..., 4;
quantization steps q, with j=0, ..., 4;
codebook.

The size of the codebook and of the variables depends on the quantizer design. When a 8-bits quantizer is used, the encoder uses the following data:

luminance thresholds $a_i$ values: look-up table having 4 entries of 11 bits (44 bits);
edge thresholds $b_{ij}$ values: look-up table having 16 entries of 11 bits (176 bits);
quantization steps $Q_j$ values: look-up table having 5 entries of 8 bits (40 bits);
codebook: look-up table having 1152 entries of 20 bits (23040 bits, 22.5 Kbits).

The total memory requirement for the encoder is 23300 bits, 22.7 Kbits.

The decoder uses in its turn:

coordinate tables of reconstruction points: 2 look-up tables having 1152 entries of 10 bits (23040 bits).

The total memory requirement for the decoder is 22.5 Kbits.

In the reduced encoding procedure described above, the values corresponding to the pair of pixels can be selected from the same line or from two lines.

In the first case, the advantage is that no line memory is needed.

In the second case to code the value of the current line, the values of the previous line must be accessible, by way of example through the use of a suitable a line memory. In the second case, being the values less distant, the pixels pair are formed with similar values and the compression operations performs better.

In the following Table 5 the performance in term of PSNR for different image classes for the one line or two line procedure is shown. 10 bits RGB images and Bayer patterns are considered:

TABLE 5

| | PNSR (dB) | | | |
|---|---|---|---|---|
| | Bayer data | | RGB | |
| Image class | One line | Two line | One line | Two line |
| Rajaz | 51.26 | 51.27 | 58.39 | 58.45 |
| Indoor | 49.04 | 49.11 | 53.18 | 53.25 |
| Outdoor | 48.37 | 48.61 | 52.07 | 52.32 |
| Noisy | 48.87 | 48.96 | 53.58 | 53.62 |

The advantages of using the proposed reduced encoding procedure reside in avoiding multiplication and division operation by performing the corresponding calculations through simpler operations. This allows also for saving the 54% of the memory used.

The reduced number of elements in the table further allows for boosting the code search phase. The code search in the proposed reduced encoding procedure is performed on 895 elements if x≠y
256 elements if x=y while previously coding search was done on 2048 elements.

Summarizing, the proposed reduced encoding procedure determines a lower computational count, a lower encoding/decoding time, less power consumption, while providing for Bayer pattern compression, fixed size codes (useful, i.e., for bandwidth constraints, visual lossless quality, low cost in both the encoding and the decoding phase (i.e., for pure hardware implementation), and reliability since Vector Quantization avoids error propagation.

A better compression ratio can be obtained using a cascading DPCM+VLC algorithm.

Finally, it is noted that a further optimization of the proposed reduced encoding procedure is possible by further exploiting existing symmetries in the encoding and decoding steps.

Perceptual vector quantization is a two step process. First, the input vector is quantized to the nearest reconstruction point. Second, the binary code associated with the reconstruction point is outputted. The inverse operation (the dequantization) is a one step process: from the binary code back to the reconstruction point. The graph of the quantization error can be seen in FIG. 10 and it is related to the original space partitioning.

The symmetry respect to the diagonal is just one possible tool that can be exploited in order to reduce memory requirements of the encoding/decoding system. Other symmetries could be exploited.

A relatively complex implementation of perceptual vector quantization for the bi-dimensional case will be illustrated in the following. By such an implementation, the input vector is a 16 bits value (2 pixels with 8 bit intensity), while the output code is a 9 bit value. Assuming that only 508 codes are used out of 512, this leaves some code available for special purposes (as data synchronization).

Now the step from the input vector to the reconstruction point is analyzed.

The input vector $x=(x_1, x_2 \ldots x_n)$ contains in general intensities of a color component of a group of n adjacent pixels. The group should be as circular as possible so that the distortion due to quantization error is not direction dependent (i.e., it is isotropic). The input vector undergoes some simple processing in order to compute the edge/texture level and the high-luma level. The higher the value of these variables, the rougher the quantization can be, thanks to masking effects.

Next, the quantization step is computed using some simple rule, which is based on both variables or only on edge/texture level (which is the main masking effect). Finally each component of the input vector is scalar quantized with this quantization step. The edge/texture level is chosen to be the Euclidean distance between the point in the N-dimensional space corresponding to the input vector and the diagonal whose equation is $x1=x2=\ldots=xN$. For the bidimensional case this is simply the difference between the two intensities. For the N-dimensional case the distance can be computed as Euclidean distance or, alternatively, a suitable approximation can be used.

The high-luma level is chosen to be the intersection with the diagonal in the quantization space. For both the two-dimensional and the N-dimensional case this is the average intensity. If N is chosen to be a power of two, then no divisions are needed, a bit shift is sufficient instead.

Zone boundaries and quantization step can be computed in real time or read from small look-up tables based on edge/texture level and high-luma level. The latter is an example implementation, as there are few numbers to be stored. In an embodiment, the quantization step is chosen to be a power of two, so that no division is actually needed to quantize the input vector, instead a bit shift is sufficient.

In the implementation example considered, the two dimensional quantization space has been partitioned in four zones having 1 (along the diagonal), 8, 16 and 32 (by the corners) as quantization steps.

Partitions are made only using the edge/texture level.

Few comparisons are required to find the zone of the input vector. Product vector quantization is then applied. Thanks to the chosen quantization steps, the quantization can be reduced to bit shifts, some logic and two adders.

Next, a check whether the zone's boundary has been crossed is performed. Crossing towards the diagonal poses no problem in this example, while crossing toward the corner requires some simple correction to be applied to find the nearest allowed quantized vector.

The above, in the bidimensional case is obtained through the following computer program, where xq and y1 are the quantized vectors, D1 a edge threshold vector, D2 a luma threshold vector, Q a quantization step vector, ET the edge level, HL2 the luma level, HL the average luma level, HLQ2 the quantized luma level, ETQ the quantized edge level.

```
function [xq.yq]=f1(x,y);
D1=[5, 24, 80, 0];
D2=[1, 24, 80, 257);
Q=[1, 8, 16, 32];
ET=abs(x-y);
HL2=x+y;
HL=round(HL2/2);
If ET>=D1 (3), I=4;
elseif ET>=D1(2), I=3;
elseif ET>-=D1(I), I=2;
else I=1;
end;
xq=roundIx/Qd))*Q(I);
yq=round(y/Q(I))*Q(1);
HLQ2=xq+yq;
ETQ-abs(xq-yq);
if ETQ >=D2(I),
  if I==1,
    xq=HL;
    yq=HL;
  else
  if x<y,
    if HL2>-HLQ2, xq=xq+Q(I);
    else yq=yq-Q(I);
    end;
  else
    if HL2<HLQ2, xq-xq-Q(I);
    else yq=yq+Q(I);
    end;
  end;
  end;
end;
return;
```

The correction for zones having one quantization step seems different only because it has been optimized so that it is a one step computation. Actually if more iterations are allowed, it is just the same as the correction applied for other zones.

It is noted that a straightforward implementation of this function could provide for a look-up table with 256!1'256=65536 entries and 16 bits for each entry, representing the quantized vector, also known as reconstruction point.

Now the step from the reconstruction point to the output binary code is analyzed.

The output code can be computed based on the quantized vector $(x_{1Q}, x_{2Q} \ldots x_{NQ})$. This means using a suitable numbering scheme for the reconstruction points in each zone.

For the bidimensional perceptual vector quantization illustrated here, a simple solution is shown which makes use of only one real multiplier is shown by the following computer program, where F is a inversion flag; CO a correction vector and code is the output binary code.

```
function [code]=f2(xq,yq);
D1=[5, 24, 80, 0];
Q=[1, 8, 16, 32];
ETQ=abs(xq-yq);
if ETQ>=D1(3), I=4;
elseif ETQ>=D1(2), I=3;
elseif ETQ>=D1(1), I=2;
else I=1;
end;
qxq=fix(xq/Q(I));
qyq=fix(yq/Q(I));
F0TBL=[0, 1, 2, 3];
F1TBL=[0, 1, 2, 5];
F2TBL=[255, 30, 12, 0];
F=qxq>qyq;
if F, t1=qxq; t2=qyq;
else t1=qyq; t2=qxq;
end;
code1=(t1-F0TBL(I))+t2*F1TBL(I);
if t2>F2TBL(I),
    code2=fix((t2-F2TBL(I))* ...
    (t2-F2TBL(I)-1)/2);
else
    code2=0;
end;
CO=[0, 256, 319, 382, 424, 466, 487, 508];
J=21-1-F;
code=code1-code2+CO(J);
return;
``` where t1 and t2 represent temporary store variables, F1TBL and F2TBL indicate tables containing rules of assignment of an identification number for each cell in the different triangular, trapezoidal and rectangular areas in which are such cells subdivided.

It is noted that an implementation of this function could provide for an associative look-up table with 512 entries and 16+9 bits for each entry (16 bits are for the associative key tag, 9 bits for the output data).

Alternatively, an ordered table with 512 entries can be used. The code is the 9 bits index of the selected element. The search is dichotomic and it is done in 9 steps at most.

Figure 14:

Finally, in FIG. 14 it shown an example of a picture traced using the binary codes outputted by the perceptual vector quantization in place of the pixel intensities. It can be seen that codes can be chosen in a better way, so that a pre-view of the image is possible without actually decompressing the image, as shown in FIG. 14.

The value of a given code should be almost proportional to the mean luma of the associated reconstruction point. This make it possible to treat codes as super-pixels.

Also, the difference between two given codes should be proportional to the euclidean distance of the associated reconstruction points.

If such conditions are met, it is easy to see that another compression method can be profitably chained to the perceptual VQ as statistic is preserved, e.g., DPCM and Huffman coding can be used on the codes of FIG. 12b to capture the remaining mathematical redundancy.

Figure 15:
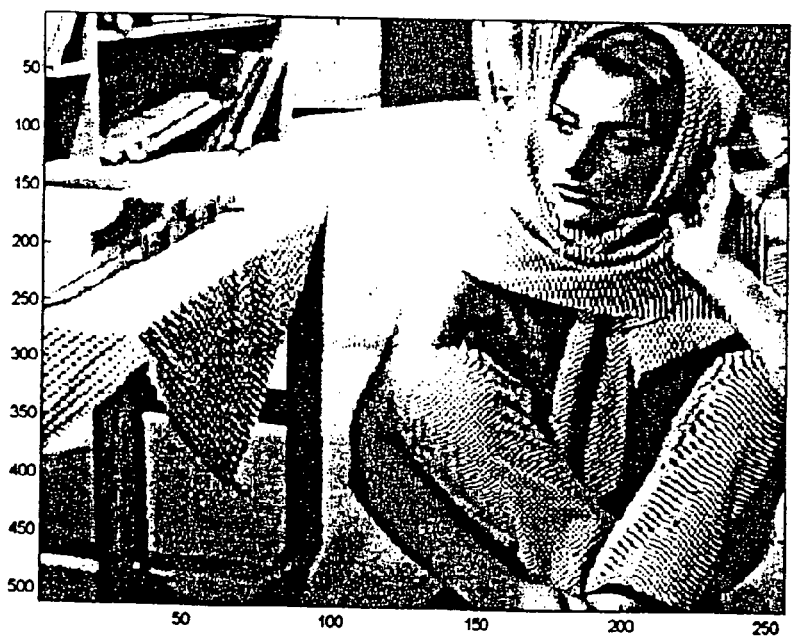

Optimal mapping, which result is shown in FIG. 15, is the natural outcome when using an ordered look-up table to find the code of a given reconstruction point.

Going from output binary code to the reconstruction point, the quantized vector can be reconstructed from the output code by reversing the computations performed when numbering the reconstruction points in each zone. This is illustrated by the following computer program:

```
function [xq, yq]=f3(code)
Q=[1, 8, 16, 32]
F0TBL=[0, 1, 2, 3]
ZWTBL=[1, 2, 3, 6]
F3TBL=[256, 62, 39, 6]
MTBL=[255, 62, 41, 20]
FIB=[0, 1, 3, 6, 10, 15, 21]
CO=[0, 256, 319, 382, 424, 466, 487, 508]
J=sum(code>=co)
F=mod(J+1,2)
I=fix(J/2)+1
N=code-CO(J)
if N>=F3TBL(I)
    K=sum((MTBL(I)-N>=FIB);
    N=N+FIB(KTBL(I)-K;
end;
t1=fix(N/ZWTBL(I));
t2=N-FIB(KTBL(I)-K);
if F qyq=t1; qxq=t2;
else qyq=t2; qxq=t1;
    end
    xq=qxq*Q (I);
    yq=qyq*Q (I);
    if xq==256, xq=255; end;
    if yq-256, yq=255; end;
return;
```

It is noted that an implementation of this function could provide: a small look-up table with 512 entries and 16 bits for each entry, representing the reconstruction point.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

Of course, without prejudice to the principle of the invention, the details of implementation and the embodiments may be amply varied with respect to what is described and illustrated herein, without thereby departing from the scope of the present invention, as defined in the claims that follow.

What is claimed is:
1. A process, comprising:
converting digital video signals organized in blocks of pixels between a first format and a second format, said second format being a format compressed via vector quantization, the converting being performed by at least one processing device and including:
obtaining said vector quantization from repeated application of a scalar quantizer to the pixels of said blocks with a quantization step determined in an adaptive way according to characteristics of the pixels, said quantization step being determined so as to increase according to a lack of uniformity of the pixels in the block;

representing said vector quantization in a n-dimensional space indicative of characteristics on n of said pixels in the block partitioned into cells of size proportional to said quantization step, each cell being assigned to an appropriate binary code; and identifying at least one symmetry element in said n-dimensional space suitable for separating at least two symmetrical sets of cells, and selecting one of said at least two symmetrical sets of cells for the assignment of said binary codes, wherein said video signals in said first format are signals generated according to a so-called Bayer pattern, which can be ordered in blocks of size 4×2 having the following pattern of chromatic components:

row $1=G_1R_1G_2R_2$,
row $2=B_1G_3B_2G_4$;

and wherein said vector quantization is a two-dimensional vector quantization applied to pairs $<R_1, R_2>$, $<B_1, B_2>$ together with $<G_1, G_2>$, $<G_3, G_4>$ or $<G_1, G_3>$, $<G_2, G_4>$.

2. The process according to claim 1, wherein said selecting one of said at least two symmetrical sets of cells for the assignment of said binary codes includes performing a symmetrical permutation on the n pixels of the block.

3. The process according to claim 2, wherein said selecting one of said at least two symmetrical sets of cells for the assignment of said binary codes is associated to a setting a part of said binary code indicating a status of said symmetrical permutation.

4. The process according to claim 3 wherein said binary code includes a reduced code formed by said part of said binary code indicating the status of said symmetrical permutation and by a code part assigned to the respective cell and used as an index in a code table.

5. The process according to claim 4 wherein said code table includes a set of fields comprising the respective coordinates of the cell and a field for said reduced code.

6. The process according to claim 5, wherein said coordinates of the cell in the tables are searched by a dichotomic search.

7. The process according to claim 5, further including decoding that comprises using said reduced code for accessing tables in which said coordinates of the cells are stored, said accessing being function of said code part of said binary code indicating the status of said symmetrical permutation.

8. The process according to claim 1, further comprising detecting a level brightness of pixels in a block and determining said quantization step in such a way that said quantization step increases as a function of said level of brightness.

9. The process according to claim 8 wherein detecting the level of brightness of the pixels in the block is carried out by detecting a mean level of brightness of the pixels in the block.

10. The process according to claim 1, further comprising:
detecting a lack of uniformity of the pixels in a block;
detecting a level of brightness of the pixels in the block;
dividing said level of brightness of the pixels in the block in a number of classes; and
selecting a value of said quantization step in a different way according to the classes thus determined.

11. The process according to claim 1, further comprising:
identifying a value of edge sharpness in each of said blocks of pixels, dividing the edges into a number of classes; and
attributing values to said quantization step differentiated according to the classes thus determined.

12. The process according to claim 11 wherein brightness and edge classes are stored in look-up tables.

13. The process according to claim 1 where said quantization step is determined by a law increasing according to multiples.

14. The process according to claim 1 wherein said quantization step is made to increase and decrease by multiples or sub-multiples.

15. The process according to claim 1, wherein in passage from said first format to said second format, said digital video signals are subjected to at least one of the following:
sub-sampling;
low-pass filtering for anti-aliasing purposes before sub-sampling; and
multiplexing of at least one part of digital data necessary for representation of an image.

16. The process according to claim 1 wherein the digital video signals include multiplexed chromatic components, wherein in passage from said first format to said second format, the process further comprising re-ordering the pixels in each block to be quantized by composing them in a vector such that the multiplexed chromatic components are quantized separately.

17. The process according to claim 1, further comprising identifying, in a context of said digital video signals, blocks of uniform pixels, choosing for said blocks of uniform pixels a minimum quantization step among quantization steps adopted in said vector quantization.

18. The process according to claim 1, further comprising prediction of the binary codes according to a DPCM scheme.

19. The process according to claim 1 wherein in passage from said first format to said second format, the signal compressed via vector quantization is subjected to entropic encoding.

20. The process according to claim 19 wherein said entropic encoding is performed with a technique chosen from at least one of run-length encoding, Huffmann encoding, and arithmetic encoding.

21. The process according to claim 1 wherein said vector quantization is a multi-dimensional vector quantization resulting from concatenation of a plurality of vector quantizations, each resulting from repeated application of a scalar quantization.

22. The process according to claim 21 wherein for each of said concatenated vector quantizers, binary codes of reconstruction points are assigned in such a way that the reconstruction points with small distance in multi-dimensional space have binary codes with small difference.

23. The process according to claim 1 wherein said digital video signals in said second format are subjected to a change of co-ordinates to a color space chosen from at least one of YCbCr, YUV, UIQ, and YDbDr.

24. The process according to claim 1 wherein said vector quantization is applied to adjacent pairs of pixels in a luminance plane.

25. A process, comprising:
converting digital video signals organized in blocks of pixels between a first format and a second format, said second format being a format compressed via vector quantization, the converting being performed by at least one processing device and including:
obtaining said vector quantization from repeated application of a scalar quantizer to the pixels of said blocks with a quantization step determined in an adaptive way according to characteristics of the pixels, said quantization step being determined so as to increase according to a lack of uniformity of the pixels in the block;

representing said vector quantization in a n-dimensional space indicative of characteristics on n of said pixels in the block partitioned into cells of size proportional to said quantization step, each cell being assigned to an appropriate binary code; and identifying at least one symmetry element in said n-dimensional space suitable for separating at least two symmetrical sets of cells, and selecting one of said at least two symmetrical sets of cells for the assignment of said binary codes, wherein said vector quantization is obtained with application of two scalar quantizers with quantization steps scaled by constants 2/3 and $\sin(\pi/3)$.

26. The process according to claim 25, further comprising defining points of reconstruction allowed so that these points will form a hexagonal lattice.

27. The process according to claim 26 wherein said quantization step is determined according to at least one law chosen from the following:

$m*E_Q+q$; and
$m*(t\hat{}E_Q)+q$;

where m and q are constants, determined selectively, and $E_Q$ is an index which identifies an edge class.

28. The process according to claim 25 wherein said video signals in said first format are signals generated according to a so-called Bayer pattern, which can be ordered in blocks of size 4×2 having the following pattern of chromatic components:

row 1=$G_1R_1G_2R_2$,
row 2=$B_1G_3B_2G_4$;

and wherein said vector quantization is a two-dimensional vector quantization applied to pairs <$R_1$, $R_2$>, <$B_1$, $B_2$> together with <$G_1$, $G_2$>, <$G_3$, $G_4$> or <$G_1$, $G_3$>, <$G_2$, $G_4$>.

29. A system for converting digital video signals organized in blocks of pixels between a first format and a second format, said second format being a format compressed via vector quantization, the system comprising:

at least one converter chosen between an encoder and a decoder and wherein said converter is configured for a vector quantization resulting from repeated application of a scalar quantizer to the pixels of said blocks with a quantization step determined in an adaptive way according to characteristics of the pixels, said quantization step being determined so as to increase according to a lack of uniformity of the pixels in the block, and the converter being further configured to represent said vector quantization in a n-dimensional space indicative of characteristics on n of said pixels in the block partitioned into cells of size proportional to said quantization step, in order to exploit said lack of uniformity of the pixels in the block, each cell being assigned to an appropriate binary code, wherein said converter is further configured to identify at least one symmetry element in said n-dimensional space suitable for separating at least two symmetrical sets of cells, and to select one of said at least two symmetrical sets of cells for the assignment of said binary codes, and wherein said video signals in said first format are signals generated according to a so-called Bayer pattern, which can be ordered in blocks of size 4×2 having the following pattern of chromatic components:

row 1=$G_1R_1G_2R_2$,
row 2=$B_1G_3B_2G_4$;

and said vector quantization is a two-dimensional vector quantization applied to pairs <$R_1$, $R_2$>, <$B_1$, $B_2$> together with <$G_1$, $G_2$>, <$G_3$, $G_4$> or <$G_1$, $G_3$>, <$G_2$, $G_4$>.

30. The system according to claim 29 wherein said converter is configured to select one of said at least two symmetrical sets of cells for the assignment of said binary codes by performing a symmetrical permutation on the pixels of the block.

31. The system according to claim 30, wherein said converter is configured to set a part of said binary code indicating a status of said symmetrical permutation when selecting one of said at least two symmetrical sets of cells for the assignment of said binary codes.

32. The system according to claim 31, wherein said converter is configured to include in said binary code a reduced code formed by said part of said binary code indicating the status of said symmetrical permutation and by a code part assigned to the respective cell and used as index in a code table comprised in said converter.

33. The system according to claim 32, wherein said code table includes a set of fields comprising the respective coordinates of the cell and a field for said reduced code.

34. The system according to claim 33 wherein said converter is a decoder configured for implementing a decoding procedure that comprises using said reduced codes for accessing tables in which said coordinates of the cells are stored, said accessing tables being a function of said code part of said binary code indicating the status of said symmetrical permutation.

35. The system according to claim 29 wherein said converter is configured to detect a level of brightness of pixels in a block and determine said quantization step in such a way that said quantization step grows as a function of said level of brightness.

36. The system according to claim 29 wherein said converter is configured to:

detecting a lack of uniformity of the pixels in a block;
detecting a level of brightness of the pixels in the block; and
dividing said level of brightness of the pixels in the block in a number of classes; and
selecting a value of said quantization step in a different way according to the classes thus determined.

37. The system according to claim 29 wherein said converter is configured to detect a level of brightness of the pixels in the block by detecting a mean level of brightness of the pixels in the block.

38. The system according to claim 29 wherein said converter is an encoder configured to:

identifying a value of edge sharpness in each of said blocks of pixels, dividing the edges into a number of classes; and
attributing values to said quantization step differentiated according to the classes thus determined.

39. The system according to claim 38 wherein said converter is configured to determine said quantization step (Q) according to at least one law chosen from:

$m*E_Q+q$; and
$m*(t\hat{}E_Q)+q$;

where m and q are constants, determined selectively and $E_Q$ is an index which identifies said edge class.

40. The system according to claim 29 wherein said converter is an encoder comprising look-up tables for storing brightness and edge classes.

41. The system according to claim 40 wherein said converter is an encoder configured for searching said coordinates of the cell in the tables are searched by a dichotomic search.

42. The system according to claim 29 wherein said converter is configured to determine said quantization step by a law increasing according to multiples.

43. The system according to claim 29 wherein said converter is an encoder configured to subject said digital video signals to at least one operation chosen from:
sub-sampling;
low-pass filtering for anti-aliasing purposes before sub-sampling; and
multiplexing of at least one part of digital data necessary for representation of an image.

44. The system according to claim 29 wherein the digital video signals comprise multiplexed chromatic components, wherein said converter is an encoder configured to re-order the pixels in each block to be quantized by composing them in a vector such that the multiplexed chromatic components are quantized separately.

45. The system according to claim 29 wherein said converter is an encoder configured to identify, in a context of said digital video signals, blocks of uniform pixels and to choose for said blocks of uniform pixels a minimum quantization step among quantization steps adopted in said vector quantization.

46. The system according to claim 29 wherein said converter is configured in such a way that said digital video signals in said second format are expressed in a form of binary codes associated to respective quantized signals and wherein said converter is configured to execute a function of prediction of said binary codes.

47. The system according to claim 46 wherein said function of prediction of the binary codes is carried out according to a DPCM scheme.

48. The system according to claim 29 wherein said converter is configured to subject the signals converted from said first format to said second format to a function of entropic encoding or decoding.

49. The system according to claim 48 wherein said entropic encoding is performed with a technique chosen from at least one of: run-length encoding, Huffmann encoding, and arithmetic encoding.

50. The system according to claim 29 wherein said converter is configured for a vector quantization having a multi-dimensional vector quantization resulting from concatenation of a plurality of vector quantizations, each resulting from repeated application of a scalar quantization.

51. The system according to claim 50 wherein said converter is configured to assign binary codes of reconstruction points for each of said concatenated vector quantizations in such a way that the reconstruction points with small distance in a multi-dimensional space have binary codes with small difference.

52. The system according to claim 29 wherein said digital video signals in said second format are subjected to a change of coordinates to a color space chosen from at least one of YCbCr, YUV, UIQ, and YDbDr.

53. The system according to claim 29 wherein said vector quantizer is applied to adjacent pairs of pixels in a luminance plane.

54. The system according to claim 29 wherein in said digital video signals in said second format, chrominance planes are sub-sampled according to a quincuncial pattern.

55. A system for converting digital video signals organized in blocks of pixels between a first format and a second format, said second format being a format compressed via vector quantization, the system comprising:
at least one converter chosen between an encoder and a decoder and wherein said converter is configured for a vector quantization resulting from repeated application of a scalar quantizer to the pixels of said blocks with a quantization step determined in an adaptive way according to characteristics of the pixels, said quantization step being determined so as to increase according to a lack of uniformity of the pixels in the block, and the converter being further configured to represent said vector quantization in a n-dimensional space indicative of characteristics on n of said pixels in the block partitioned into cells of size proportional to said quantization step, in order to exploit said lack of uniformity of the pixels in the block, each cell being assigned to an appropriate binary code, wherein said converter is further configured to identify at least one symmetry element in said n-dimensional space suitable for separating at least two symmetrical sets of cells, and to select one of said at least two symmetrical sets of cells for the assignment of said binary codes, wherein said converter is configured to obtain an application of two scalar quantizers with quantization steps scaled by constants 2/3 and $\sin(\pi/3)$.

56. The system according to claim 55 wherein said converter is configured to define points of reconstruction allowed so that these points will form a hexagonal lattice.

57. The system according to claim 55 wherein said video signals in said first format are signals generated according to a so-called Bayer pattern, which can be ordered in blocks of size 4×2 having the following pattern of chromatic components:

row $1=G_1R_1G_2R_2$ row $2=B_1G_3B_2G_4$ and wherein said vector quantization is a two-dimensional vector quantization applied to pairs $<R_1, R_2>$, $<B_1, B_2>$ together with $<G_1, G_2>$, $<G_3, G_4>$ or $<G_1, G_3>$, $<G_2, G_4>$.

58. An non-transitory article of manufacture, comprising:
a machine-readable medium having instructions stored thereon to:
convert a digital video signal organized in blocks of pixels from a first format to a second format, including instructions to use vector quantization to compress the first format into the second format;
to obtain the vector quantization, repeatedly apply a scalar quantizer to the pixels of the blocks with an adaptive quantization step based on characteristics of the pixels, said quantization step being determined so as to increase according to a lack of uniformity of the pixels in the block;
represent said vector quantization in a n-dimensional space indicative of characteristics on n of said pixels in the block partitioned into cells of size proportional to said quantization step, in order to exploit said lack of uniformity of the pixels in the block, each cell being assigned to an appropriate binary code; and
identify at least one symmetry element in said n-dimensional space separating at least two diagonally symmetrical sets of cells in the representation of the vector quantization, and select one of said at least two diagonally symmetrical sets of cells for the assignment of said binary codes.

59. The non-transitory article of manufacture of claim 58 wherein the machine-readable medium further includes instructions stored thereon to simultaneously reduce statistical and perceptive redundancy of data in the video signal.

60. The non-transitory article of manufacture of claim 58 wherein the video signals include multiplexed chromatic components, and wherein the machine-readable medium further includes instructions stored thereon to quantized the multiplexed chromatic components separately.

61. The non-transitory article of manufacture of claim 58 wherein the machine-readable medium further includes instructions stored thereon to concatenate a plurality of vector quantizations to obtain a multi-dimensional vector quantization, each of the vector quantizations resulting from repeated application of a scalar quantization.

62. The non-transitory article of manufacture of claim 61 wherein the machine-readable medium further includes instructions stored thereon to:
 divide edges in each of the blocks of pixels into classes; and
 adapt the quantization step based on the classes.

63. The non-transitory article of manufacture of claim 58 wherein the machine-readable medium further includes instructions stored thereon to:
 divide a level of pixels in the blocks into classes; and
 adapt the quantization step based on the classes.

64. A system, comprising:
 means for receiving a digital video signal organized into blocks of pixels at a first format and for outputting the digital video signal at a second format;
 means for encoding the digital video signal from the first format to the second format;
 means for performing vector quantization to compress the digital video signal at the first format into the second format using repeated application of a scalar quantizer to the pixels of the blocks, including a means for adaptively determining a quantization step based on characteristics of the pixels, said quantization step being determined so as to increase according to a lack of uniformity of the pixels in the block;
 means for representing said vector quantization in a n-dimensional space indicative of characteristics on n of said pixels in the block partitioned into cells of size proportional to said quantization step, in order to exploit said lack of uniformity of the pixels in the block, each cell being assigned to an appropriate binary code; and
 means for identifying at least one symmetry element in said n-dimensional space separating at least two diagonally symmetrical sets of cells in the representation of the vector quantization, and for selecting one of said at least two diagonally symmetrical sets of cells for the assignment of said binary codes.

65. The system of claim 64 wherein the means for adaptively determining the quantization step include a means for changing the quantization step based on at least one of lack of uniformity of pixels in a block, a level of brightness of pixels in the block, and values of edge sharpness of an image.

66. The system of claim 65, further comprising a means for quantizing multiplexed chromatic components of the digital video signal separately.

67. The system of claim 65, further comprising a means for executing a function of prediction of binary codes that are associated to respective quantized signals and that are used to express the digital video signals in the second format.

68. The system of claim 65 wherein the means for performing vector quantization include a means for concatenating a plurality of vector quantizations, each resulting from repeated application of a scalar quantization.

69. The system of claim 64 wherein said means for determining said quantization step is configured to:
 identify a value of edge sharpness in each of said blocks of pixels, dividing the edges into a number of classes; and
 attribute values to said quantization step differentiated according to the classes thus determined, and wherein said quantization step includes choosing at least one law from:
 $m^*E_Q+q$; and
 $m^*(t^{\wedge}E_Q)+q$;
 where m and q are constants, determined selectively and $E_Q$ is an index which identifies the edge class.

70. A process, comprising:
 converting digital video signals organized in blocks of pixels between a first format and a second format, said second format being a format compressed via vector quantization, the converting being performed by at least one processing device and including:
 obtaining said vector quantization from repeated application of a scalar quantizer to the pixels of said blocks with a quantization step determined in an adaptive way according to characteristics of the pixels, said quantization step being determined so as to increase according to a lack of uniformity of the pixels in the block;
 representing said vector quantization in a n-dimensional space indicative of characteristics on n of said pixels in the block partitioned into cells of size proportional to said quantization step, each cell being assigned to an appropriate binary code; and
 identifying at least one symmetry element in said n-dimensional space separating at least two diagonally symmetrical sets of cells in the representation of the vector quantization, and selecting one of said at least two diagonally symmetrical sets of cells for the assignment of said binary codes.

71. The process of claim 70, further comprising:
 detecting a lack of uniformity of the pixels in a block;
 detecting a level of brightness of the pixels in the block;
 dividing said level of brightness of the pixels in the block in a number of classes; and
 selecting a value of said quantization step in a different way according to the classes thus determined.

72. The process of claim 70, further comprising:
 identifying a value of edge sharpness in each of said blocks of pixels, dividing the edges into a number of classes; and
 attributing values to said quantization step differentiated according to the classes thus determined.

73. The process of claim 72 wherein said quantization step is determined according to at least one law chosen from the following:
 $m^*E_Q+q$; and
 $m^*(t^{\wedge}E_Q)+q$;
 where m and q are constants, determined selectively, and $E_Q$ is an index which identifies said edge class.

74. The process of claim 70, wherein in passage from said first format to said second format, said digital video signals are subjected to at least one of the following:
 sub-sampling;
 low-pass filtering for anti-aliasing purposes before sub-sampling; and
 multiplexing of at least one part of digital data necessary for representation of an image.

75. A system for converting digital video signals organized in blocks of pixels between a first format and a second format, said second format being a format compressed via vector quantization, the system comprising:
 at least one converter chosen between an encoder and a decoder and wherein said converter is configured for a vector quantization resulting from repeated application of a scalar quantizer to the pixels of said blocks with a quantization step determined in an adaptive way according to characteristics of the pixels, said quantization step being determined so as to increase according to a lack of uniformity of the pixels in the block, and the converter being further configured to represent said vector quantization in a n-dimensional space indicative of characteristics on n of said pixels in the block partitioned into cells of size proportional to said quantization step, in order to exploit said lack of uniformity of the pixels in the block, each cell being assigned to an appropriate binary code, wherein said converter is further configured to identify at least one symmetry element in said n-dimensional space separating at least two diagonally symmetrical sets of cells of the representation of the vector quantization, and to select one of said at least twos diagonally symmetrical sets of cells for the assignment of said binary codes.

76. The system according to claim 75 wherein said converter is configured to select one of said at least two diagonally symmetrical sets of cells for the assignment of said binary codes by performing a symmetrical permutation on the pixels of the block.

77. The system according to claim 75 wherein said converter is configured to detect a level of brightness of pixels in a block and determine said quantization step in such a way that said quantization step grows as a function of said level of brightness.

78. The system according to claim 75 wherein said converter is an encoder configured to:
identifying a value of edge sharpness in each of said blocks of pixels, dividing the edges into a number of classes; and
attributing values to said quantization step differentiated according to the classes thus determined.

79. The system according to claim 75 wherein the digital video signals comprise multiplexed chromatic components, wherein said converter is configured to re-order the pixels in each block to be quantized by composing them in a vector such that the multiplexed chromatic components are quantized separately.

80. The system according to claim 75 wherein said converter is configured to express said digital video signals in said second format in a form of binary codes associated to respective quantized signals and wherein said converter is configured to execute a function of prediction of said binary codes.

81. The system according to claim 75 wherein said digital video signals in said first format are digital video signals in an RGB format and wherein said digital video signals in said second format are subjected to a change of coordinates to a color space chosen from at least one of YCbCr, YUV, UIQ, and YDbDr.

* * * * *